(12) United States Patent
Lundvall

(10) Patent No.: US 9,104,033 B2
(45) Date of Patent: Aug. 11, 2015

(54) IMAGE FOILS PROVIDING A SYNTHETIC INTEGRAL IMAGE

(75) Inventor: Axel Lundvall, Solna (SE)

(73) Assignee: ROLLING OPTICS AB, Stockholm (SE)

( * ) Notice: Subject to any disclaimer, the term of this patent is extended or adjusted under 35 U.S.C. 154(b) by 616 days.

(21) Appl. No.: 13/129,592

(22) PCT Filed: Nov. 13, 2009

(86) PCT No.: PCT/EP2009/065103
§ 371 (c)(1),
(2), (4) Date: May 17, 2011

(87) PCT Pub. No.: WO2010/057831
PCT Pub. Date: May 27, 2010

(65) Prior Publication Data
US 2011/0222152 A1    Sep. 15, 2011

(30) Foreign Application Priority Data

Nov. 18, 2008  (SE) ........................................ 0850081
Jun. 23, 2009  (SE) ........................................ 0950483

(51) Int. Cl.
*G02B 27/22*    (2006.01)
*G07D 7/12*     (2006.01)
(Continued)

(52) U.S. Cl.
CPC ............ *G02B 27/2214* (2013.01); *B42D 25/29* (2014.10); *G07D 7/124* (2013.01); *G07D 7/128* (2013.01); *B42D 25/324* (2014.10); *B42D 2035/20* (2013.01); *B42D 2035/50* (2013.01)

(58) Field of Classification Search
CPC .............. G02B 27/22–27/2292; B42D 15/105; G03H 1/0011; G07D 7/12–7/128

USPC ........................ 359/1–35, 618–640, 462–477
See application file for complete search history.

(56) References Cited

U.S. PATENT DOCUMENTS 5,712,731 A * 1/1998 Drinkwater et al. .......... 359/619
5,822,119 A * 10/1998 Rasmussen et al. .......... 359/515
(Continued)

FOREIGN PATENT DOCUMENTS

CN    1813259 A    8/2006
CN    1906547 A    1/2007
(Continued)

OTHER PUBLICATIONS

Full English translation of Japanese Notice of Reasons for Rejection for Japanese Application No. 2011-536831, dated Jan. 6, 2014.

*Primary Examiner* — Stephone B Allen
*Assistant Examiner* — Jeffrey Madonna
(74) *Attorney, Agent, or Firm* — Birch, Stewart, Kolasch & Birch, LLP

(57) ABSTRACT

An optical device for providing a synthetic integral image (25) comprises a polymer foil stack. A first interface of the polymer foil stack comprises optically distinguishable image data bearer structures (16A-C) in a first array. A second interface of the polymer foil stack has focusing elements (1) in a second array. A ratio between distances between neighboring objects in the first array and of focusing elements in the second array in a first direction is different from a ratio between distances between neighboring objects in the first array and of focusing elements in second array in a second direction. This leads to that the synthetic integral image corresponding to the image data bearer structures is perceptible with requested proportions when the polymer foil stack is given a certain curvature. Also polymer foil stacks giving rise to synthetic integral image only when viewed from a very short distance are described. The appearance of the synthetic integral image during bending or moving of the polymer foil stack is used for authentication. A change in apparent image depth during rotation is alternatively used for authentication.

10 Claims, 14 Drawing Sheets

(51) Int. Cl.
    *B42D 25/29*    (2014.01)
    *B42D 25/324*    (2014.01)

(56)            References Cited

U.S. PATENT DOCUMENTS

| 5,944,356 | A | 8/1999 | Bergmann et al. | |
|---|---|---|---|---|
| 6,822,769 | B1* | 11/2004 | Drinkwater et al. | 359/2 |
| 2005/0180020 | A1 | 8/2005 | Steenblik et al. | |
| 2008/0116276 | A1 | 5/2008 | Lo | |
| 2008/0130074 | A1* | 6/2008 | Heierli et al. | 359/2 |
| 2009/0008923 | A1 | 1/2009 | Kaule et al. | |
| 2009/0102179 | A1 | 4/2009 | Lo | |
| 2009/0231698 | A1* | 9/2009 | Hashimoto et al. | 359/476 |
| 2011/0122499 | A1* | 5/2011 | Commander et al. | 359/626 |
| 2011/0209328 | A1* | 9/2011 | Steenblik et al. | 29/428 |

FOREIGN PATENT DOCUMENTS

| EP | 0216626 A2 | 4/1987 |
|---|---|---|
| JP | 2005-038144 A | 2/2005 |
| JP | 2007-003760 A | 1/2007 |
| WO | WO 94/27254 A1 | 11/1994 |
| WO | WO 2005/052650 A2 | 6/2005 |
| WO | WO 2007/076952 A2 | 7/2007 |

\* cited by examiner

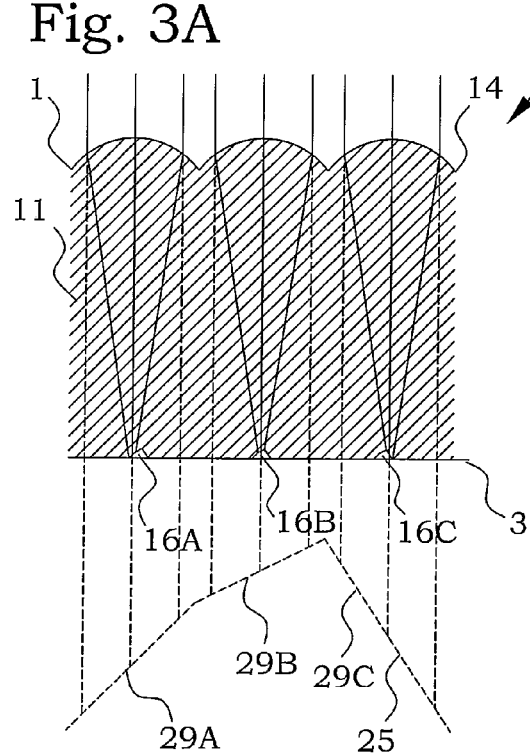
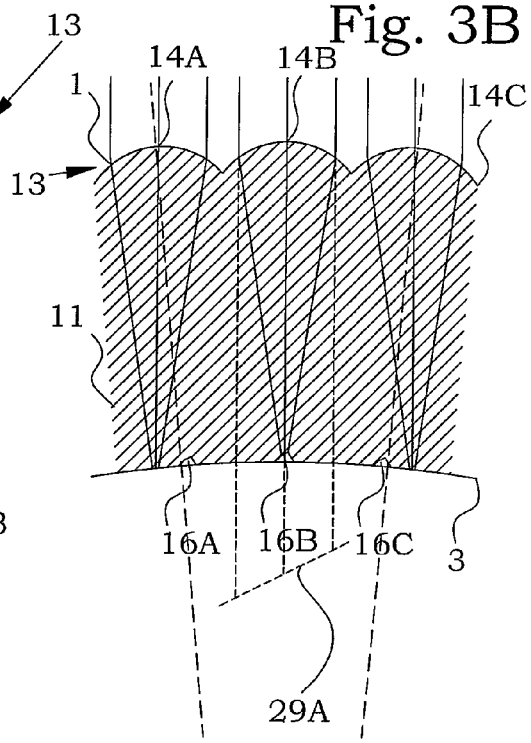
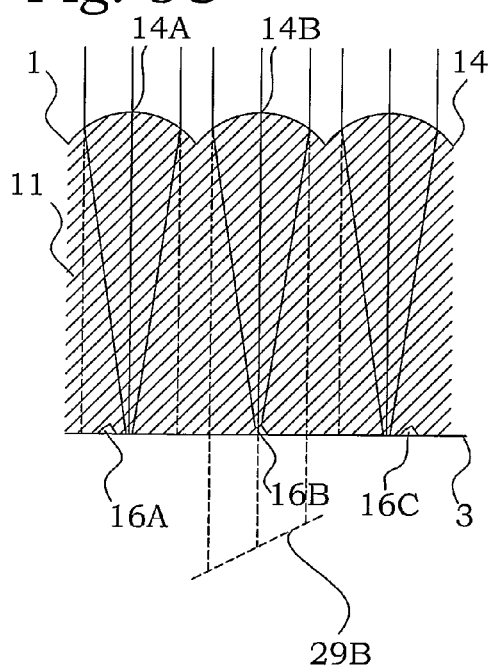
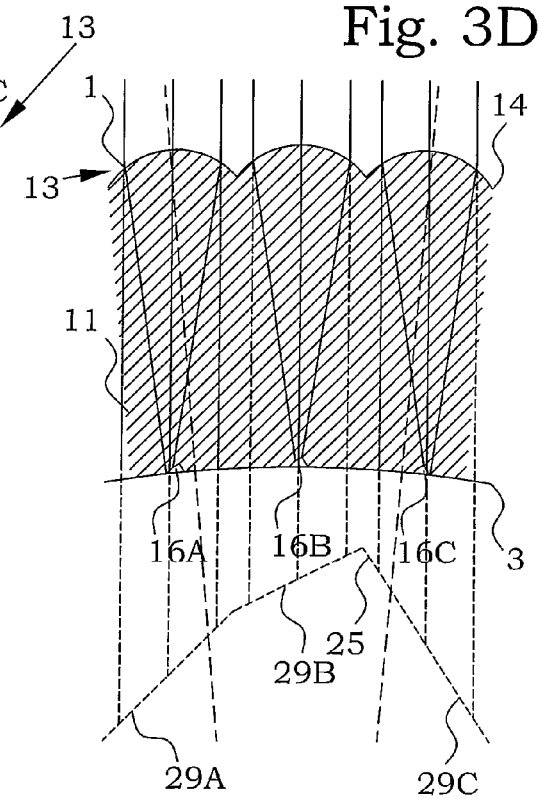

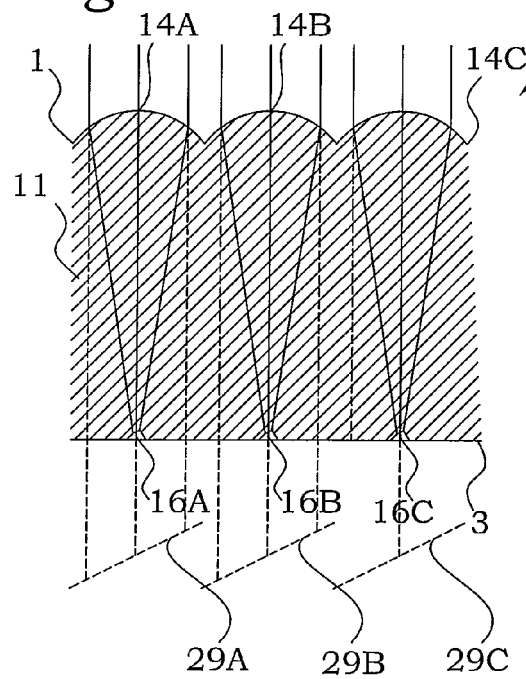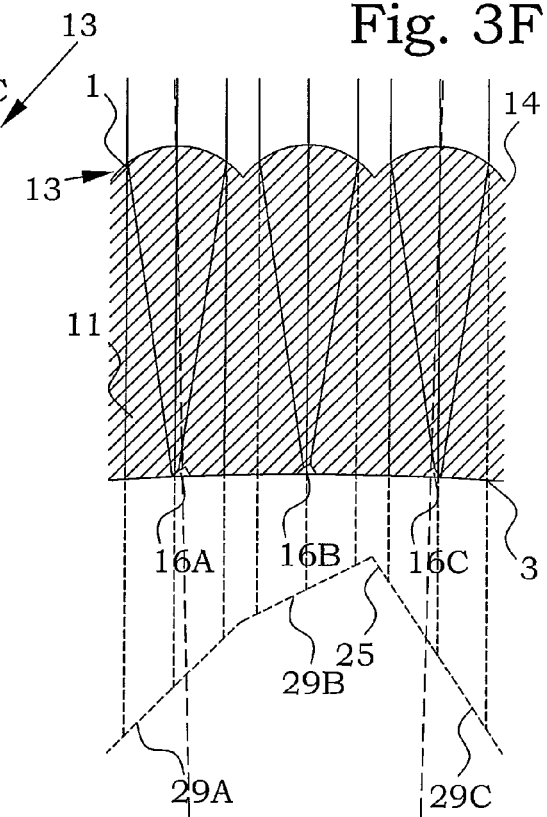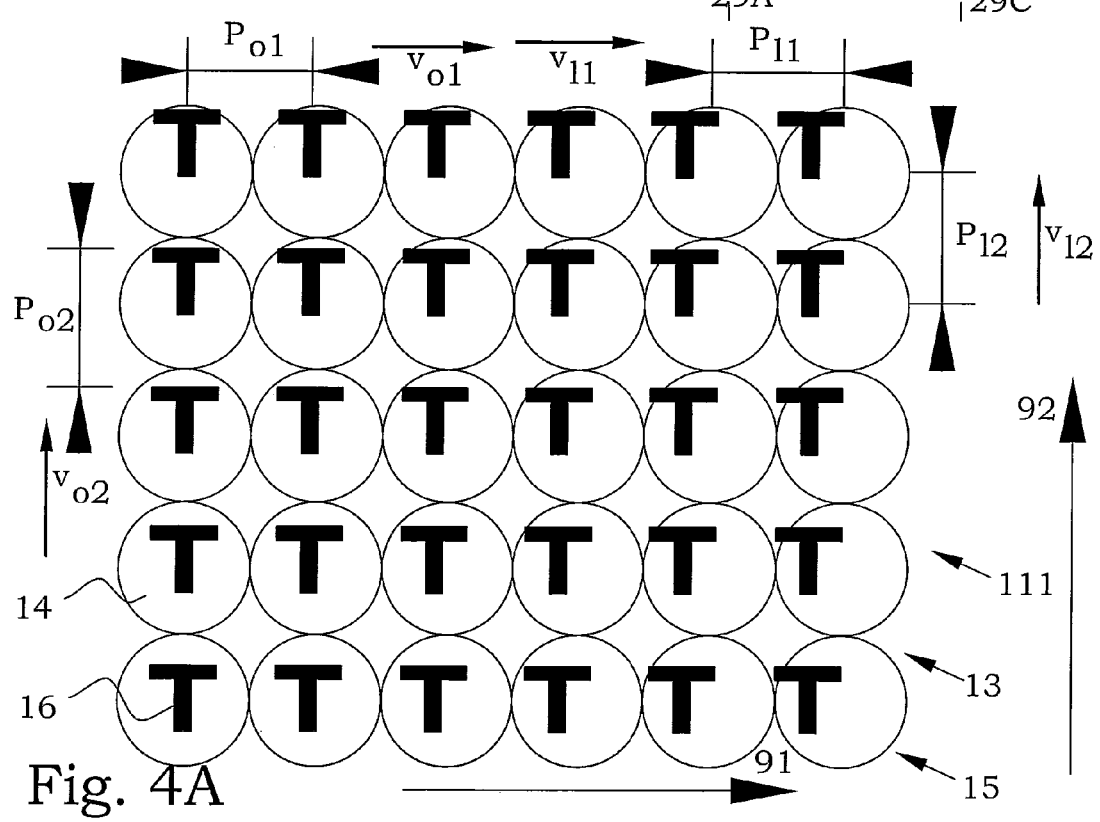

Fig. 10A
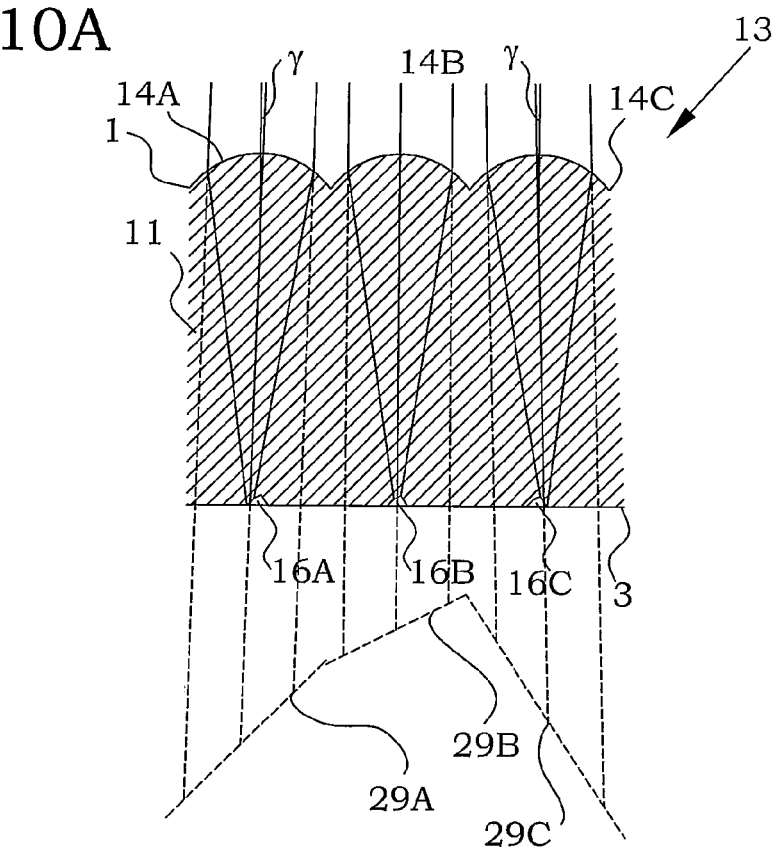
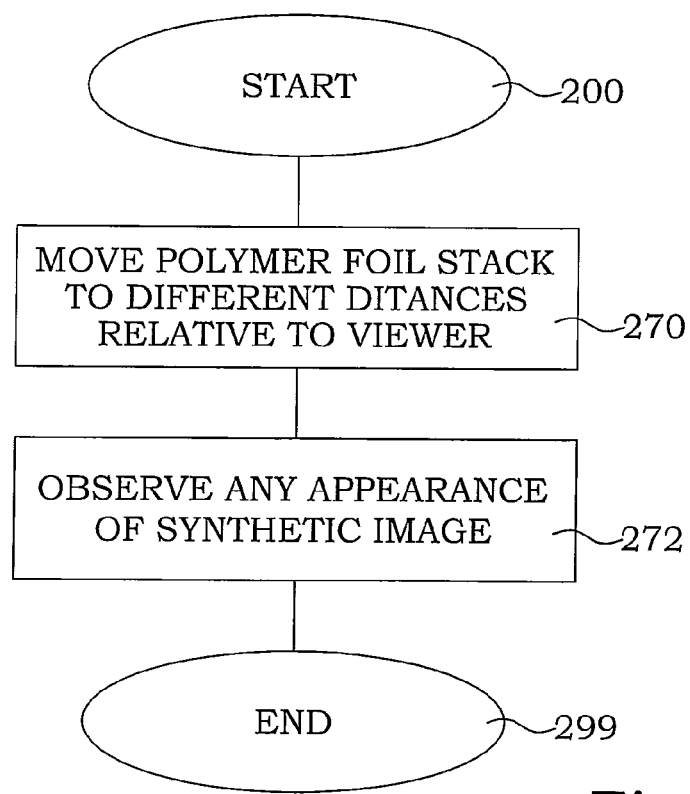
Fig. 11

IMAGE FOILS PROVIDING A SYNTHETIC INTEGRAL IMAGE

TECHNICAL FIELD

The present invention relates in general to optical devices and in particular to optical devices providing a synthetic image.

BACKGROUND

Planar optical arrangements giving rise to a synthetic image or an image that changes its appearance at different angles have been used in many applications. Besides purely esthetical uses, such arrangements have been used e.g. as security labels on bank-notes or other valuable documents, identification documents etc. The synthetic images, typically with a more or less pronounced three-dimensional character, have also been used for providing better geometrical understanding of complex shapes in e.g. two-dimensional information documents.

In the published international patent application WO 94/27254, a security device is disclosed. The security device comprises an array of microimages which, when viewed through a corresponding array of substantially spherical microlenses, generates a magnified image. This result is achieved according to the long known Moiré effect and was now applied to provide security labels with images having a three-dimensional appearance. The array may also be bonded to the array of microimages.

In the published US patent application US 2005/0180020, a micro-optic security and image presentation system is disclosed, being based on a similar basic idea. A film material utilizes a regular two-dimensional array of non-cylindrical lenses to enlarge micro-images or image data bearer structures of an image plane. By adapting the focal properties of the lenses, the distance between the lenses and the image plane, the diameter of the lenses, different magnifications, field of view etc. may be changed. Optoparallactic motion is achieved by having discrepancies in aligning between image plane and lens plane.

Images of this kind are also used as sheet material for e.g. packages. The packages achieve in such a way an eye-catching appearance, which typically is desired when marketing fancy or expensive products. If the synthetic images are made three-dimensional, the images may e.g. be configured to appear to be suspended inside (or even outside) the packages. However, since the arrangement utilize optical effects achieved with a planar configuration of image data bearer structures and lenses, such images have so far been limited to packages having planar surfaces. The synthetic image will typically deteriorate when applied e.g. on a curved bottle surface.

When the optical arrangement is used as a security device, it is important that the images that are perceived behave in a manner that is difficult to copy with simple means, but which are easy for the user to observe. Few security devices in prior art fulfill such requirements, if any at all. There are needs for security devices with unique structures and properties that are easy to detect and verify, but difficult to tamper or copy.

In the published European patent application EP 0 216 626, an image sheet for tamper-evident packages is disclosed. The sheet comprises a pattern of glass microspheres provided on top of a film, which microspheres function as microlenses. Axial markings are caused to be created at a sheet in contact with the rear of the microsphere by exposing the sheet for high-energy radiation. By making such axial marking creation when the film is held in a curved shape, an integral image, composed by the axial markings viewed through the microspheres, will be destroyed if the curvature is changed. If such a film e.g. is provided over the opening of a container, the existence of an image ensures that the container content is not tempered. A disadvantage of such an arrangement is that the image creation has to be performed when the film is applied at its final substrate. This makes efficient mass production very difficult. The approach of creating the axial markings by irradiation through the microspheres also puts severe limitations of what kind of images can be created. Furthermore, since the creation of axial markings has to be performed by intense irradiation at the final product, this kind of security device cannot be used for irradiation sensitive goods.

SUMMARY

An object of the present invention is to provide optical devices providing a high-quality synthetic image when being bent or having a curved surface. Another object is to provide improved security devices with unique structures and properties that are easy to detect and verify, but difficult to tamper or copy.

The above objects are achieved by devices and methods according to the enclosed patent claims. In general words, according to a first aspect, an optical device for providing a synthetic integral image comprises a polymer foil stack. The polymer foil stack comprises at least one polymer foil. A first interface of the polymer foil stack comprises optically distinguishable image data bearer structures in a first array. A second interface of the polymer foil stack has focusing elements in a second array. The second interface is provided at a distance from the first interface. The image data bearer structures in the first array are repeated with first object distances in a first object direction and with second object distances in a second object direction, provided at a first angle with respect to the first object direction. The focusing elements in the second array are repeated with first focusing element distances in a first focusing element direction and with second focusing element distances in a second focusing element direction, provided at a second angle with respect to the first focusing element direction. First projected object distances are the first object distances as projected onto the first focusing element direction and second projected object distances are the second object distances as projected onto the second focusing element direction. At least one of first ratios between corresponding pairs of the first projected object distances and the first focusing element distances and second ratios between corresponding pairs of the second projected object distances and the second focusing element distances are close or equal to unity, whereby the synthetic integral image corresponding to the image data bearer structures is perceptible with requested proportions from a viewing side of the polymer foil stack when viewed from a very small distance.

According to a second aspect, a method for authentication of an object is disclosed. The method is performed on a polymer foil stack provided at a surface of the object. The polymer foil stack comprises at least one polymer foil. A first interface of the polymer foil stack comprises optically distinguishable image data bearer structures in a first array. A second interface of the polymer foil stack has focusing elements in a second array. The second interface is provided at a distance from the first interface. The method comprises moving the polymer foil stack in either direction between a first distance relative a viewer and a second distance relative a viewer. The second distance is considerably smaller than the first distance. The method further comprises observing of any appearance of a first synthetic integral image corresponding to the image data bearer structures with requested proportions during the moving as sign of authenticity.

According to a third aspect, an optical device for providing a synthetic integral image comprises a polymer foil stack. The polymer foil stack comprises at least one polymer foil. A first interface of the polymer foil stack comprises optically distinguishable image data bearer structures in a first array. A second interface of the polymer foil stack has focusing elements in a second array. The second interface is provided at a distance from the first interface. The image data bearer structures in the first array are repeated with first object distances in a first object direction and with second object distances in a second object direction, provided at a first angle with respect to the first object direction. The focusing elements in the second array are repeated with first focusing element distances in a first focusing element direction and with second focusing element distances in a second focusing element direction, provided at a second angle with respect to the first focusing element direction. First projected object distances are defined as the first object distances as projected onto the first focusing element direction and second projected object distances are defined as the second object distances as projected onto the second focusing element direction. First ratios between corresponding pairs of the first projected object distances and the first focusing element distances differs from second ratios between corresponding pairs of the second projected object distances and the second focusing element distances. This leads to that the synthetic integral image corresponding to the image data bearer structures is perceptible with requested proportions from a viewing side of the polymer foil stack when the polymer foil stack is given a certain curvature.

According to a fourth aspect, a method for authentication of an object having a polymer foil stack provided at a surface of the object is disclosed. The method is performed on a polymer foil stack comprising at least one polymer foil. A first interface of the polymer foil stack comprises optically distinguishable image data bearer structures in a first array. A second interface of the polymer foil stack has focusing elements in a second array. The second interface is provided at a distance from the first interface. The method comprises bending of the polymer foil stack according to a predetermined first curvature in a predetermined first direction and observing of any appearance of a first synthetic integral image corresponding to said image data bearer structures with requested proportions as sign of authenticity.

According to a fifth aspect, a method for authentication of an object having a polymer foil stack provided at a surface of the object is disclosed. The method is performed on a polymer foil stack comprising at least one polymer foil. A first interface of the polymer foil stack comprises optically distinguishable image data bearer structures in a first array. A second interface of the polymer foil stack has focusing elements in a second array. The second interface is provided at a distance from the first interface. The method comprises rotating of the polymer foil stack around an axis having a component parallel to a viewing direction and observing any change in apparent image depth of a synthetic integral image corresponding to the image data bearer structures as sign of authenticity.

One advantage with the present invention is that synthetic images with good quality now can be provided at a variety of non-planar surfaces. Another advantage with the present invention is that security images with easily distinguishable properties are provided, which security images are difficult to copy. Other advantages are further discussed in connection with different embodiments in the detailed description.

BRIEF DESCRIPTION OF THE DRAWINGS

The invention, together with further objects and advantages thereof, may best be understood by making reference to the following description taken together with the accompanying drawings, in which:

FIGS. 3A-3B are schematic cross-sectional illustrations how an embodiment of an optical device for providing a synthetic integral image according to prior art behaves when being bent;

FIGS. 3C-3D are schematic cross-sectional illustrations how an embodiment of optical device according to the present invention behaves when being bent;

FIGS. 3E-3F are schematic cross-sectional illustrations how another embodiment of optical device according to the present invention behaves when being bent;

FIGS. 4A-4B are schematic top view illustrations of embodiments of optical device according to the present invention;

FIG. 10A is a schematic cross-sectional illustration how an embodiment of an optical device for providing a synthetic integral image according to prior art behaves when being viewed from a short distance;

FIG. 11 is a flow diagram of steps of another embodiment of a method according to the present invention.

DETAILED DESCRIPTION

Throughout the drawings, the same reference numbers are used for similar or corresponding elements.

The optical device according to the present invention operates according to principles known as the Moiré effect. In the present application, the Moiré effect provides a magnification of a pattern and at the same time gives a synthetic integral, typically three-dimensional, image. Such an integral image is a perfect candidate to be used as security label or simply for being eye-catching. The Moiré magnifying principle as such is well known from the literature, and overviews can be found e.g. in "The Moiré magnifier" by M. C. Hutley et. al., Pure Appl. Opt. 3, 1994, pp. 133-142 or in "Properties of moiré magnifiers" by H. Kamal et al., Optical Engineering 37 (11), November 1998, pp. 3007-3014. Arrangements operating according to the Moiré effect to obtain 3D images generally require high precision regarding the alignment of the lens array and the array of objects to be magnified.

Figure 1A:
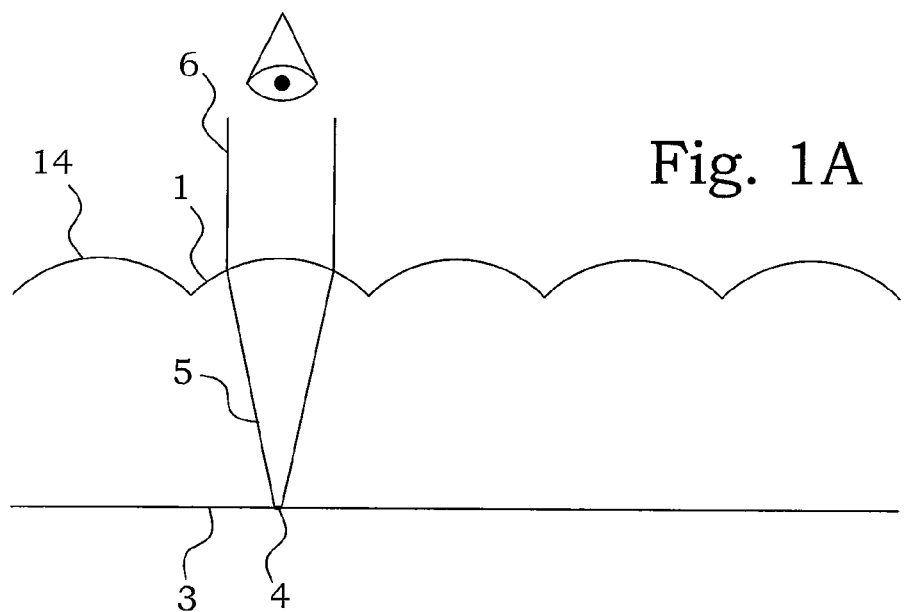
FIGS. 1A-1C are illustrations of different focusing elements.
Figure 1B:
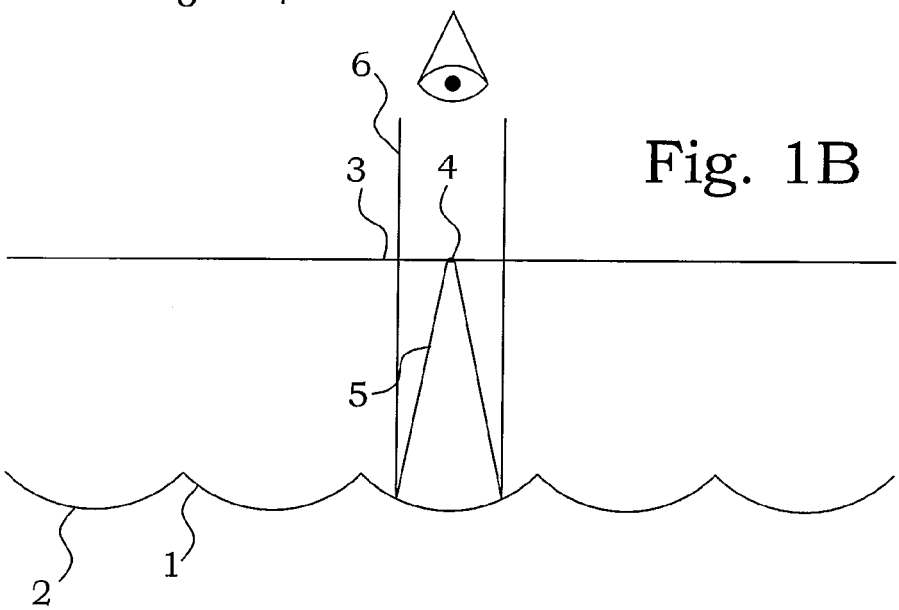
Figure 1C:
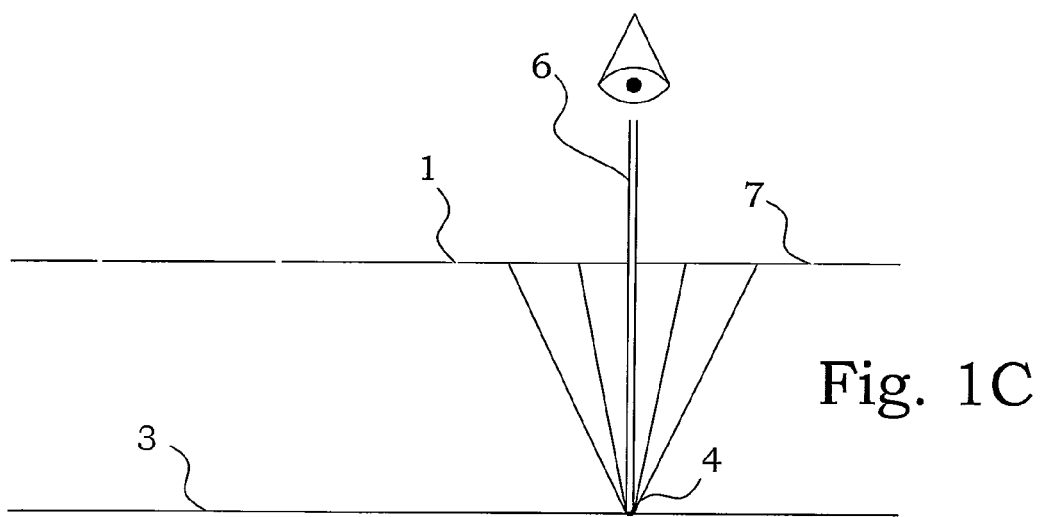

In the present disclosure, the term "focusing element" is used. Most devices based on the Moiré effect make use of different types of lenses or curved mirrors. However, this term is in the present disclosure intended to cover different types of equipment resulting in a selection of optical information from a small area. FIGS. 1A-C illustrate three examples of such focusing elements. In FIG. 1A, a focussing element 1, here in the form of a microlens 14, is provided at a distance from an object plane 3. The distance is equal or close to a focal length of the microlens 14. Rays 5 from a small area 4 at the object plane 3 are refracted in the microlens 14, giving rise to a bunch of parallel rays 6 leaving the microlens 14. A viewer, looking at the microlens will only see the small area 4, enlarged to cover the entire area of the microlens 14.

In FIG. 1B, a focussing element 1, here in the form of a curved mirror 2, is provided at a distance from an essentially transparent object plane 3. The distance is equal or close to a focal length of the curved mirror 2. Rays 5 from a small area 4 at the object plane 3 are reflected in the curved mirror 2, giving rise to a bunch of parallel rays 6 passing through the object plane 3. A viewer, looking at the object plane 3 will mainly see the small area 4, enlarged to cover the entire area of the curved mirror 2. The image of the small area is somewhat influenced by e.g. the small area 4 during the passage through the object plane 3. In this embodiment, the viewer will see a mirror image of the small area 4, since it is viewed through the curved mirror 2.

In FIG. 1C, a focussing element 1, here in the form of an aperture 7, is provided above an object plane 3. A ray 6 from a small area 4 at the object plane 3 is the only ray that can pass the plane of the aperture 7 in a predetermined direction. A viewer, looking at the plane of the aperture can only see the small area 4, however, in this embodiment not enlarged.

In the rest of the present disclosure, microlenses will be used for illustrating focussing elements. However, corresponding ideas are also applicable to other types of focussing elements by making necessary changes in geometry and configuration.

Figure 2A:
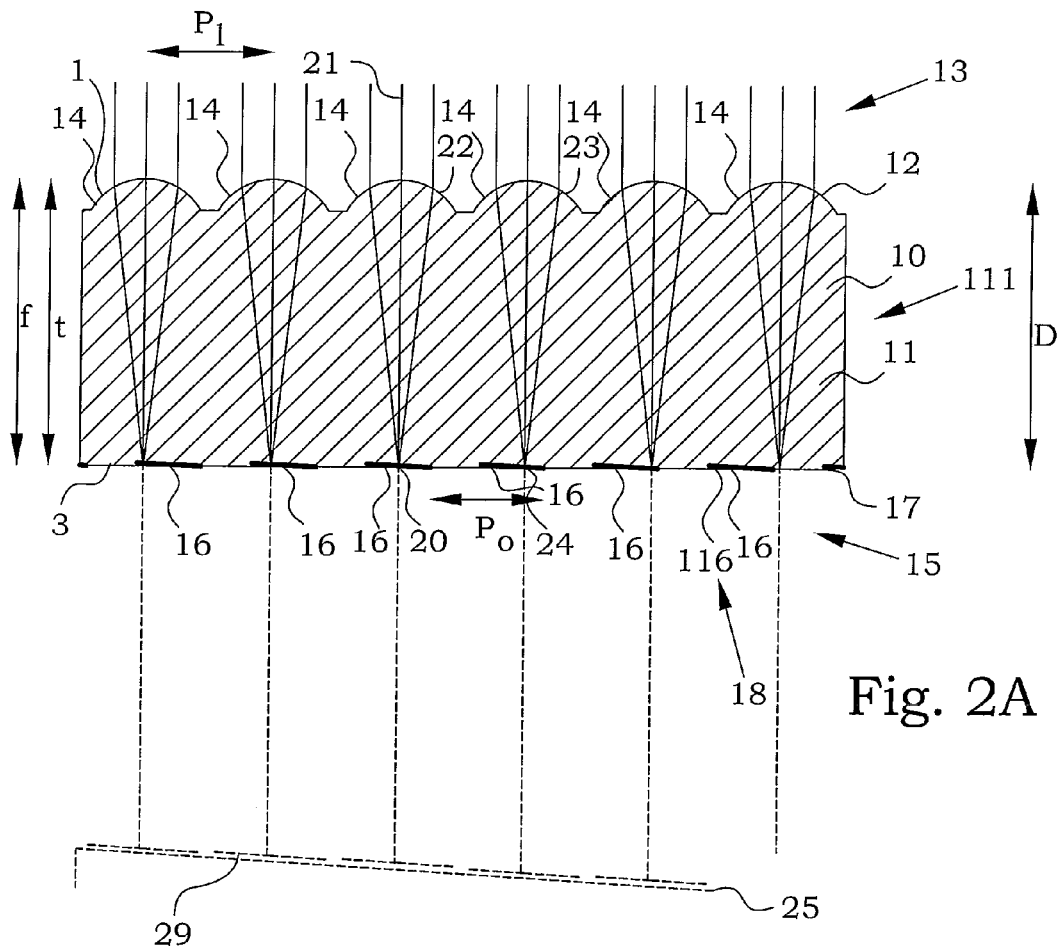
FIG. 2A is a schematic cross-sectional illustration of an optical device for providing a synthetic integral image according to prior art.

In order to understand the advantages of the present invention, a conventional optical device based on integration of magnified images of small image data bearer structures is first described. FIG. 2A illustrates schematically a cross-sectional view of an embodiment of an optical device 10 based on integration of magnified images of small image data bearer structures. The optical device 10 comprises a polymer foil stack 111, in this embodiment constituted by a single polymer foil 11 of thickness t. At an interface 12, in this case an outer surface of the polymer foil 11, an array 13 of focussing elements 1, in this case microlenses 14 are provided. The array 13 is typically a periodic two-dimensional array, which therefore is depicted as a one-dimensional array in the cross-sectional view of FIG. 1, with a periodicity $P_I$ in the illustrated cross-section. The array 13 preferably covers essentially the entire interface 12.

The polymer foil 11 is also provided with another array 15 of geometrical structures 16. The geometrical structures 16 cause a difference in optical properties as seen from the microlens side. In the present embodiment, the geometrical structures 16 are provided at an interface 17 of the polymer foil 11, in the present embodiment another surface, opposite to the surface at which the microlenses 14 are provided. The interface 17 can thereby be seen as an object plane 3. The geometrical structures 16 in the present embodiment therefore become an interface 17 between the interior of the polymer foil 11 and the space 18 behind the polymer foil 11. The differences in optical properties of the polymer foil 11 and the space 18 makes it possible to distinguish the shape of the geometrical structures 16. The geometrical structures 16 thereby constitutes optically distinguishable image data bearer structures 116, which together, as viewed through the microlenses 14, compose an image. Other alternatives for image data bearer structures 116 could e.g. be structures of different colours, different reflectivity or absorption, which also gives rise to differences in optical properties.

The array 15 is in the present embodiment also a periodic two-dimensional array and has furthermore the same symmetry properties as the array 13 of microlenses 14. A symmetry axis of the array 15 of geometrical structures 16 is parallel to a symmetry axis of the array 13 of microlenses 14. In other words, the arrays 13, 15 are essentially aligned by their symmetry axes. If, for example, both arrays exhibit a hexagonal pattern, the close-packed directions are aligned. The array 15 of geometrical structures 16 has a periodicity $P_o$, in the illustrated cross-section plane. The polymer foil 11 is essentially transparent or coloured transparent, at least between the pattern planes.

In order for the classical Moiré effect to be present, the periodicity $P_o$ of the array 15 of geometrical structures 16 differs by a non-integer factor from the periodicity $P_I$ of the array 13 of microlenses 14. This relation determines the magnifying factor, as will be described more in detail below. Furthermore, the array 15 of geometrical structures 16 has to be provided at a distance D from the first side 12 of the polymer foil 11 that is sufficiently close to a focal length f of the microlenses 14. In the present embodiment, having the geometrical structures 16 at the second side 17 of the polymer foil 11, puts a requirement on that the average thickness of the polymer foil 11 should be essentially equal to the focal length f. However, the distance between the arrays 13, 15 does not have to be exact equal to the focal length f.

The magnification of the image is dependent on the relative sizes of the periodicities $P_I$ and $P_o$. In FIG. 2A, the periodicity $P_o$ of the array of image data bearer structures 116 is slightly smaller than the periodicity $P_I$ of the array of microlenses 14, i.e. $P_o < P_I$. A specific spot 20 at one of the geometrical structures 16 is in the illustrated embodiment situated exactly below, and furthermore in the focal point of, one microlens 22 of the microlenses 14. This means that light originating from the spot 20 ideally can travel through the polymer foil 11 and be refracted in the microlens above into a parallel beam of light rays 21. A spectator watching the first side 12 of the polymer foil 11 will experience the optical characteristics of the area around spot 20 spread out over the entire microlens 22, i.e. an enlarged part image 29 will be experienced. The microlens 23 will in the same manner provide another enlarged part image 29 of an area around spot 24 of another of the geometrical structures 16. Since there is a slight mismatch in periodicity, the area around spot 24 does not correspond exactly to the area around spot 20, but instead to an area slightly beside. By having a large number of microlenses 14 and geometrical structures 16, the areas that are imaged will ideally origin from every area of the geometrical structures 16. A spectator will thus experience a synthetic integral image 25 composed by the small part images 29 corresponding to a respective microlens 14. The part images 29 will together be experienced by the eye as a magnified synthetic integral image 25 of the geometrical structure 16.

From simple geometrical reasoning, it is found that the magnification becomes:

$$M = \frac{1}{F - F^2}, \text{ where } F = \frac{P_o}{P_l}. \tag{1}$$

This relation is valid for parallel rays, i.e. when the foil is viewed from a distance that can be approximated by infinity. One may notice that the magnification becomes very large when the factor F comes close to unity. For a factor equal to unity, the magnification becomes infinite, which in traditional Moiré images is not very useful, since only one single spot at the geometric structures then will be visible. In order to get a useful image, it is thus traditionally necessary that the factor F differs from unity, and that the factor F differs from any integer value, i.e. F has to be a non-integer factor.

However, in order to achieve a large magnification, the factor should preferably be close to 1. In the embodiment of FIG. 2A, the factor is smaller than 1, since $P_o < P_l$. The magnification thus has a positive value. If $P_o > P_l$, the factor is smaller than 1 and the magnification becomes negative, i.e. the image is reconstructed as an inverted image.

The design parameters of the polymer foil 11 have further impacts on the optical properties. Besides the property of magnifying the geometrical structures, the polymer foil 11 also provides a synthetic three-dimensional experience.

The focal distance of the microlens is given by:

$$f = \frac{n_2 R_l}{(n_2 - n_1)}, \tag{2}$$

where $R_l$ is the microlens radius, $n_2$ is a refractory index for the microlenses and $n_2$ a refractory index for the medium covering the microlenses 14, i.e. typically air.

Figure 2B:
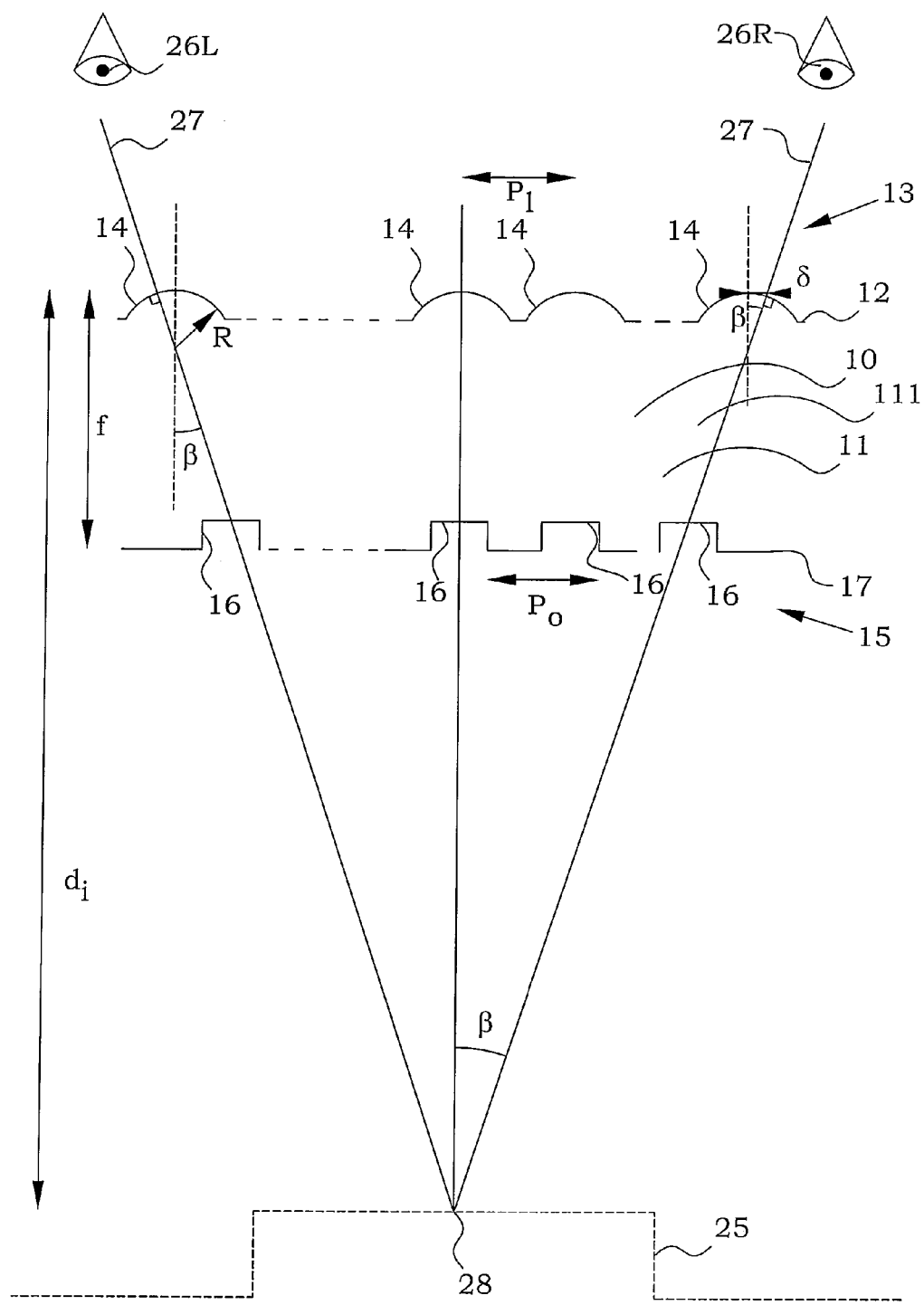
FIG. 2B is a cross-sectional view of an embodiment of an optical device illustrating image depth.

The design parameters of the polymer foil 11 have further impacts on the optical properties. Besides the property of magnifying the geometrical structures, the polymer foil 11 also provides a synthetic three-dimensional experience. FIG. 2B illustrates the experienced depth of the image. In this embodiment, the factor F is smaller than 1 and spherical microlenses are assumed. The eyes 26L, 26R of a spectator are focussed on one spot 28 on the imaginary image 25. For simplicity, the spot 28 is situated in the middle between the eyes 26L and 26R. The paraxial rays 27 to the eyes pass different microlenses 14 at a right angle but come from a corresponding spot at the geometrical structures 16. The imaginary image, however, is produced at a depth of $d_i$. An angle β of the rays 27 is easily defined in different ways in different parts of the figure by different design parameters. In the bottom part of the figure, it is seen that:

$$\tan\beta = \left(\frac{nP_l + \delta}{d_i}\right) \tag{3}$$

where δ is the distance between the centre of a spherical microlens 14 and the point in a same plane where the ray 27 intersects the lens surface, and n is an integer. Similarly, as seen in the upper left part of FIG. 2B, the angle β can also be defined as:

$$\tan\beta = \left(\frac{n(P_l - P_o)}{f - R_l}\right) \tag{4}$$

where $R_l$ is a radius of curvature of the spherical microlenses 14. Finally, as seen in the upper right part of FIG. 2B, the angle β can also be defined as:

$$\tan\beta = \left(\frac{\delta}{R}\right). \tag{5}$$

By combining (6)-(8) one finds that the image depth $d_i$ becomes:

$$d_i = \frac{f - R}{\left(1 - \frac{P_o}{P_l}\right)} + R_l \tag{6}$$

or in terms of the factor F:

$$d_i = \frac{f - R_l}{(1 - F)} + R_l \tag{7}$$

Here it is also easily seen that the second term typically is negligible, and that a factor F close to unity gives a large depth. The relation between focal length and lens radius is dependent on the choice of material, but is typically less important for the magnitude than the factor F, when F is close to unity. The integer n and the distance δ disappear, which proves that the depth $d_i$ is constant, independent on the distance to the spectator. (However, the illustrated integral image 25 will be affected by the distance and is here illustrated for a non-infinite viewing distance.)

If a factor F larger than unity is utilized, the depth $d_i$ becomes negative, i.e. the synthetic image appears to be situated in front of the lens surface, as seen by the spectator.

The above relations are valid for a plane polymer foil 11. The conditions are, however changed when the polymer foil is bent. FIG. 3A illustrates a schematic drawing of a three lens system in a plane condition. Geometrical structures 16 at an object plane 3 are seen through an array 13 of microlenses 14. As above, a synthetic integral image 25 is composed of small part images 29 corresponding to a respective microlens 14. The part images 29A-C will together be experienced by the eye as a magnified synthetic integral image 25 of the geometrical structure 16A-C.

In FIG. 3B, the polymer foil 11 is bent. A viewer is still observing the polymer foil 11 from the same position as in FIG. 3A. The curvature is convex as seen from the viewer. The relationship between the central microlens 14B and the corresponding geometrical structures 16B is essentially unchanged and the central microlens 14B will give an enlarged image 29B of a part of the geometrical structure 16B. However, the situation is not the same for the other microlenses 14A, 14C. If microlens 14A is considered, the microlens 14A is turned in an angle with respect to a ray parallel to a central ray of microlens 14B. The focus point of microlens 14A, when viewed from the front direction does no longer occur at the image plane, and furthermore is displaced in a lateral direction as compared to the corresponding geometrical structure 16A. In this slightly exaggerated illustration, the geometrical structure 16A is no longer within the focal point of microlens 14A. Analogous conditions are valid for the microlens 14C and the geometrical structure 16C. This final synthetic integral image will in this case only comprise the part images 29B of the central geometrical structure 16B. In other words, the synthetic integral image is destroyed. In a practical case, with a large number of microlenses, the synthetic integral image will deteriorate, first by changing the image proportions in the direction of the bending resulting in a compressed or expanded image in one dimension, and finally by exhibiting streaks in the image, and at the same time the sharpness of any three-dimensional appearance will decrease.

In FIG. 3C, a schematic drawing of another three lens system in a plane condition is depicted. The individual geometrical structures 16A-C are here the same as before, however, provided with a different pitch in the direction of the plane of the drawing. In other words, the distance between two neighboring geometrical structures 16A-C is changed. Note, however, that the pitch in the direction perpendicular to the drawing is still the same as in FIG. 3A. As can be seen, the synthetic integral image does not recreate the shape of the geometrical structures 16A-C in a normal fashion. The synthetic integral image in the depicted direction instead achieves a completely different magnification and imaginary image depth, which in practice leads to similar streaks in the image as was obtained in the case of FIG. 3B. The result is a synthetic image of no practical use.

In FIG. 3D, the three lens system of FIG. 3C now is bent. With a suitable bending curvature, the microlenses 14 will be positioned above a respective suitable portion of the geometrical structures 16A-C and a synthetic integral image 25 will be composed. In the FIGS. 3A and 3B compared to FIGS. 3C and 3D, the distance between two nearest neighboring geometrical structures in one direction is thus different, while the distance between nearest neighboring geometrical structures in the other direction, parallel to the bending axis, is the same.

In FIG. 3E, a schematic drawing of another three lens system in a plane condition is depicted. The individual geometrical structures 16A-C are here the same as before, however, here provided with the same pitch as the microlenses. In other words, the distance between two neighboring geometrical structures 16A-C is changed so that they coincide with the distance between two neighboring microlenses 14A-C. Note, however, that the pitch in the direction perpendicular to the drawing is still the same as in FIG. 3A. The part images 29A-C are now identical copies of the same portion of the geometrical structures 16A-C and the synthetic integral image does not give any sensible structure at all. The synthetic integral image in the direction depicted in FIG. 3E has an infinite magnification and imaginary image depth, which in practice leads to a nonsense image. The result is thus also a synthetic image of no practical use.

In FIG. 3F, the three lens system of FIG. 3E now is bent. With a suitable bending curvature, less than required in FIG. 3E, the microlenses 14 will be positioned above a respective suitable portion of the geometrical structures 16A-C and a synthetic integral image 25 will be composed.

Analogue situations occur when the polymer foil 11 is bent in the opposite direction, i.e. into a concave shape as seen from the viewer. The relations between the positions of the microlenses and the geometrical structures will be influenced similarly, but now in the opposite direction.

Furthermore, in the illustrative examples above, identical geometrical structures have been used for simplicity. However, more sophisticated or irregular geometrical structure arrays can also be used with a similar result.

FIG. 4A illustrates a part of an embodiment of an optical device according to the present invention as viewed in a direction parallel to a normal to a normal of the foil or foil stack. An array 15 of geometrical structures 16, in this embodiment illustrated with a "T" is placed under and viewed through an array 13 of focusing elements 1, in this embodiment, microlenses 14, illustrated by circles. In the present embodiment, the arrays 13, 15 are rectangular arrays, however, other types of arrays are also possible to use, e.g. hexagonal, parallelipipedical etc. Also in the present embodiment, the arrays 13, 15 are periodic arrays in two dimensions. In other words, the array 13 can be characterized by two focus element unit vectors $v_{f1}$ and $v_{f2}$, representing a closest focus element distance $P_{f1}$, $P_{f2}$ between two microlenses 14 in a first focusing element direction 91 and in a second focus element direction 92, respectively. The array 15 can analogously be characterized by two object unit vectors $v_{o1}$ and $v_{o2}$, representing a closest object distance $P_{o1}$, $P_{o2}$ between two geometrical structures 16, in a first object direction and in a second object direction, respectively. In the present embodiment, the first object direction coincides with the first focusing element direction 91 and the second object direction coincides with the second focusing element direction 92. In the first focusing element direction 91, the object distance $P_{o1}$ is slightly less than the focusing element distance $P_{f1}$, which according to equation (1) above indicates a certain positive magnification. However, in the second focusing element direction 92, the object distance $P_{o2}$ is slightly larger than the focusing element distance $P_{f2}$, which according to equation (1) above instead indicates a certain negative magnification. Also the apparent image depth, positive or negative, will be different when comparing the unit vectors in the different directions. A more or less stretched image will thus be perceived by a viewer when the stack of foils 111 is plane. However, as explained in connection with FIGS. 3A-D, when the stack of foils 111 is bent with an appropriate bent shape e.g. around an axis parallel to the first focusing element direction 91, an image will appear.

It is thus worth noting that a ratio between the object distance $P_{o2}$ and the focus element distance $P_{f2}$ has a value that is different from a ratio between the object distance $P_{o1}$ and the focus element distance $P_{f1}$, or, since the arrays in the present embodiment are periodic arrays, a ratio between the length of the object unit vector $v_{o2}$ and the length of the focusing element unit vector $v_{f2}$ is different from a ratio between the length of the object unit vector $v_{o1}$, and the length of the focusing element unit vector $v_{f1}$. In prior art optical devices of similar kinds, these ratios are always the same.

From this argumentation, it is also clear that an image also is possible to create by bending the polymer foil stack 111 with an appropriate bent shape around an axis parallel to the second focusing element direction 92, however, now bent in the opposite direction. The magnification of such an image is typically different from the image obtained by bending along an axis parallel to the first focusing element direction 91.

Figure 4B:
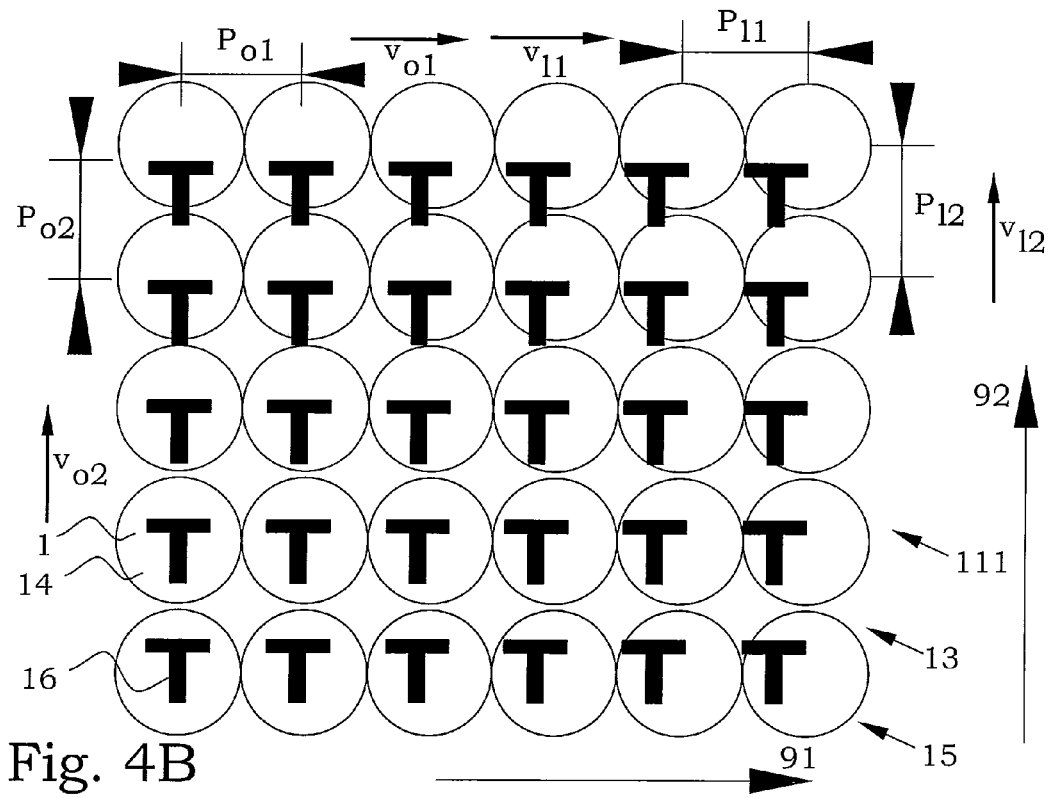

Since the differences in ratios are important to achieve the results of the present invention, such differences may also be caused by changing the distances between neighboring microlenses as well. FIG. 4B illustrates such a situation. Here, the object unit vectors $v_{o1}$ and $v_{o2}$ are of equal length, i.e. $P_{o1}$ and $P_{o2}$ have the same value. Instead, the focusing element unit vectors $v_{f1}$ and $v_{f2}$ differ in length, i.e. $P_{f1}$ and $P_{f2}$ have different values. Also in this case, a stretched or otherwise deteriorated image will be present when the stack of foils 111 is plane, but in a particular bent condition, a well-behaved image will be perceived by a viewer.

Of course, the situations in FIGS. 4A and 4B can also be combined by letting both unit vectors in the second direction vary, but in different degrees.

These conditions can be illustrated in a more mathematical approach. First, in connection to FIG. 5A, assume a stack of foils 111 that is bent with a constant radius $R_f$ around an axis 94. The stack of foils 111 thus follows the surface of a circular cylinder around the axis 94. A viewer 93, for simplicity assumed to be present at an infinite distance, views a point 95 at the stack of foils 111, defined by an angle α. The angle is defined relative a direction x perpendicular to the direction of view. A vertex point 112 of the stack of foils 111 is defined, determining the spot where x=0. This vertex point thereby also defines the intended preferred viewing direction. The negative direction of view is in the present figure denoted by y. The equation of the circle is:

$$R_f^2 = x^2 + y^2 \qquad (8)$$

Figure 5B:
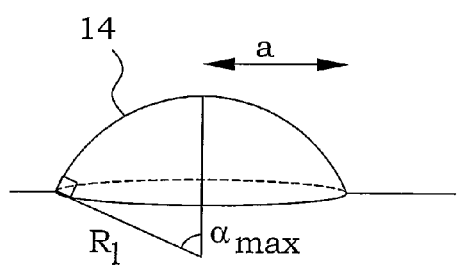
FIG. 5B is an illustration of how the maximum angle of view is defined.
Figure 5C:
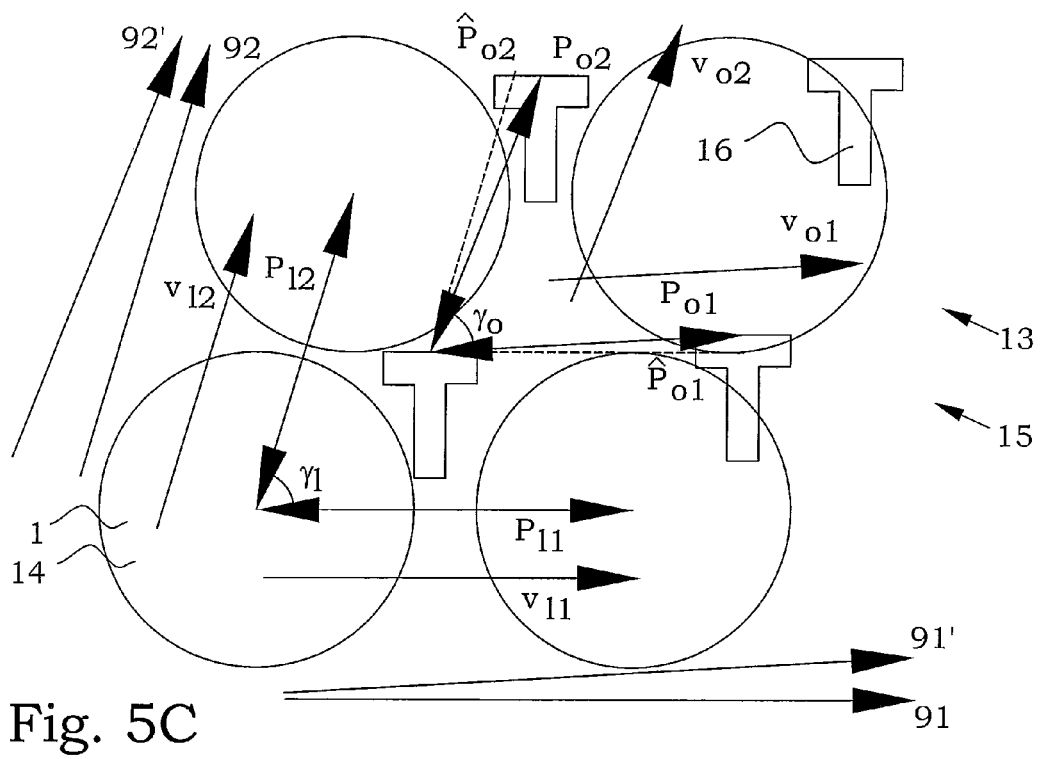
FIG. 5C is an illustration of array alignments.
Figure 5A:
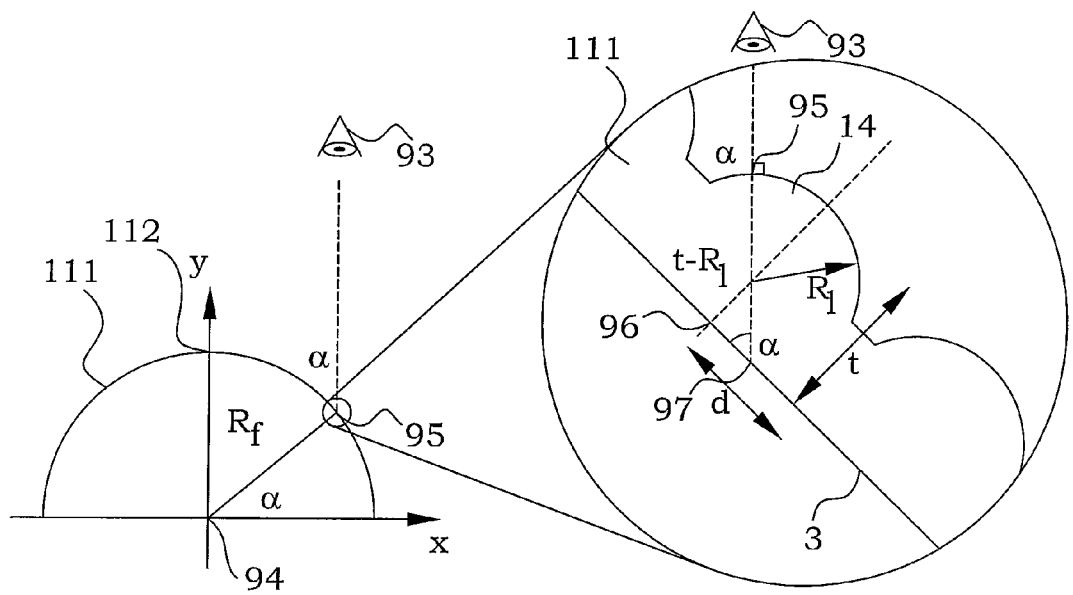
FIG. 5A is an illustration of properties of an embodiment of an optical device according to the present invention, when being bent along to a circularly cylindrical surface.

One also notices from FIG. 5A that $$\tan\alpha = \frac{x}{y}. \qquad (9)$$

By then investigating the foil stack 111 more in detail around the spot of view, as illustrated by the right part of FIG. 5A, it is easiest to follow the ray which passes the microlens 14 at a right angle. The radius of the microlens is denoted by $R_l$ and the thickness of the foil stack 111 is t. The ray passing the microlens 14 at a right angle emanates from the object plane 3 at a distance d from the position 96 at the intersection between the optical axis and the object plane 3, in a direction perpendicular to the polymer foil stack 111. In other words, d is the distance at the object plane 3 between the nominal reproduction point 96 and the point 97 that is reproduced by the viewing angle of α. It can from this be seen that:

$$\tan\alpha = \left(\frac{t - R_l}{d}\right). \qquad (10)$$

Combined with (9), this gives:

$$\frac{x}{y} = \left(\frac{t - R_l}{d}\right) \Rightarrow d = (t - R_l) \cdot \left(\frac{x}{y}\right), \qquad (11)$$

and together with (8):

$$d(x) = (t - R_l) \cdot \left(\frac{x}{\sqrt{R_f^2 - x^2}}\right). \qquad (12)$$

This formula thus describes how the distance d is changed with the variable x, if an image is to be seen from a circularly bent foil stack 111. The distance d does not increase linearly with x. This in turn means that an array that is periodic perpendicular to the bending axis therefore gives a non-constant magnification as seen over the entire viewed surface. In other words, a constant magnification over a larger circular bending section can only be achieved with varying the distance between two neighbouring geometrical structures. However, for the central parts of the foil stack 111, d is approximately linear with x and the magnification can thus be made approximately the same with use of a constant period. It is shown, that with a circularly bent foil stack, the synthetic image will be changed towards the edges, due to that d increases more rapidly when x approaches $R_f$. The approximation with a circularly bent surface is, however, in many cases sufficient since the largest difference in magnification occurs at large angles, which typically is outside the maximum field of view of the foil stack or anyway gives blurry images due to that the image structures are far outside the focal length of the lenses.

The field of view is mainly limited by the geometrical dimensions of the microlenses. FIG. 5B illustrates a microlens 14, having a base plane radius a. A maximum angle of view $\alpha_{max}$ is then given by the maximum angle, at which the microlens surface can be reached at a perpendicular angle, i.e.:

$$\alpha_{max} = \arcsin\left(\frac{a}{R_l}\right). \qquad (13)$$

When the maximum angle is exceeded, the image will rapidly deteriorate.

If a circular bending is requested, e.g. if the foil stack is intended to be put onto a bottle with circular symmetry, there is an opportunity to adapt the array of geometrical structures and/or the array of focusing elements in order to achieve the requested magnification over a larger area of the circular body. The object period and/or the focusing element period can in other words be made dynamic. Let us assume that only the object period is made dynamic in order to position the objects to compensate for the circular bending and produce an evenly magnified image. Consider again the equation (12). A dynamic period $P_{do2}$ or distance between two neighbouring geometrical structures becomes the sum of a nominal period $P_{o2}$ and the distance d:

$$P_{do2} = P_{o2} + d(x_n - x_{n-1}). \qquad (14)$$

The distance from vertex x in turn scales against the length of an n:th corresponding circular segment $S_n$, according to:

$$S_n = R_f \cdot \arcsin\left(\frac{x_n}{R_f}\right) \qquad (15)$$

$S_n$ is also a distance of the foil stack in an unbent condition, i.e. when the foil stack is plane. Therefore, the dynamic period can be obtained by combining (12), (14) and (15) be expressed as:

$$P_{do2}(n) = P_{o2} + \frac{(t - R_l) \cdot \sin\left(\frac{S_n}{R_f}\right)}{\sqrt{1 - \left(\sin\left(\frac{S_n}{R_f}\right)\right)^2}} - \frac{(t - R_l) \cdot \sin\left(\frac{S_{n-1}}{R_f}\right)}{\sqrt{1 - \left(\sin\left(\frac{S_{n-1}}{R_f}\right)\right)^2}}. \qquad (16)$$

It is of course also possible to use a foil stack with a regular period and instead provide a bending profile which is appropriate for the given regular period.

Another example of a bent shape is a parabola. The parabola is described with the relation:

$$y = \frac{x^2}{4p}, \qquad (17)$$

where p is the distance to the focal point of the parabola. After derivation of the equation, the relation reads:

$$\frac{dy}{dx} = \frac{x}{2p}. \quad (18)$$

The inverse, i.e. the derivate dx/dy corresponds to the slope of the foil where the line of sight intersects the parabola:

$$\frac{dx}{dy} = \tan\alpha = \frac{2p}{x}. \quad (19)$$

The equations (19) and (11) then give:

$$d = (t - R_l) \cdot \left(\frac{x}{2p}\right). \quad (20)$$

The distance d here increases linearly with x, and different values of p gives a curved shape with different magnifications.

These ideas can be drawn even further, so that a dynamic period of a foil stack is adapted to an arbitrary bending profile, at which an image is intended to be seen. In general, an optical device for providing a synthetic integral image comprising a polymer foil stack. The polymer foil stack comprises at least one polymer foil. A first interface of the polymer foil stack comprises optically distinguishable image data bearer structures in a first array. A second interface of the polymer foil stack has focussing elements in a second array. The second interface being provided at a distance from the first interface, preferably close to a focal length of the focussing elements.

In a most general case, the arrays do not have to be periodic and do not have to be rectangular or hexagonal and do not have to be perfectly aligned. FIG. 5C illustrates an embodiment of such a general case. A first array 15 of optically distinguishable image data bearer structures 16 comprises the image data bearer structures 16 repeated with first object distances $P_{o1}$ in a first object direction 91' and with second object distances $P_{o2}$ in a second object direction 92', provided at a first angle $\gamma_o$ with respect to the first object direction 91'. In a one-dimensionally periodic array, the first object distances $P_{o1}$ or the second object distances $P_{o2}$ is constant over the polymer foil stack area. In a two-dimensionally periodic array, both the first object distances $P_{o1}$ and the second object distances $P_{o2}$ are constant over the polymer foil stack area. When being periodic, the first array 15 is defined by a first object unit vector $v_{o1}$ and a second object unit vector $v_{o2}$, respectively, and the first object distances $P_{o1}$ are constant and equal to the length of the first object unit vector $v_{o1}$, and the second object distances $P_{o2}$ are constant and equal to the length of the second object unit vector $v_{o2}$.

A second array 13 of focusing elements 1 comprises in this embodiment the microlenses 14 repeated with first focusing element distances $P_{f1}$ in a first focusing element direction 91 and with second focusing element distances $P_{f2}$ in a second focusing element direction 92, provided at a second angle $\gamma_f$ with respect to the first focusing element direction 91. It is common that the focussing elements cover essentially the entire second interface, and typically by using a hexagonal structure, wherein the second angle $\gamma_f$ becomes equal to 60 degrees. In a one-dimensionally periodic array, the first focusing element distances $P_{f1}$ or the second focusing element distances $P_{f2}$ is constant over the polymer foil stack area. In a two-dimensionally periodic array, both the first focusing element distances $P_{f1}$ and the second focusing element distances $P_{f2}$ are constant over the polymer foil stack area. When being periodic, the second array 13 is defined by a first focusing element unit vector $v_{f1}$ and a second focusing element unit vector $v_{f2}$, respectively, and the first focusing element distances $P_{f1}$ are constant and equal to the length of the first focusing element unit vector $v_{f1}$, and the second focusing element distances $P_{f2}$ are constant and equal to the length of the second focusing element unit vector $v_{f2}$.

In a most general approach, in particular when the second array differs from being rectangular, the first focusing element direction 91 may differ from the first object direction 91', and the second focusing element direction 92 may differ from the second object direction 92'. First projected object distances $\hat{P}_{o1}$, can be defined as the first object distances $P_{o1}$ being projected onto the first focusing element direction 91 and second projected object distances $\hat{P}_{o2}$ can be defined as the second object distances $P_{o2}$ being projected onto the second focusing element direction 92. In cases the first focusing element direction 91 coincides with the first object direction 91', the first projected object distances $\hat{P}_{o1}$ therefore becomes equal to the first object distances $P_{o1}$. Similarly, in cases the second focusing element direction 92 coincides with the second object direction 92', the second projected object distances $\hat{P}_{o2}$ becomes equal to the second object distances $P_{o2}$.

According to the discussions further above, the ratios between corresponding pairs of the first projected object distances $\hat{P}_{o1}$ and the first focusing element distances $P_{f1}$ differs from ratios between corresponding pairs of the second projected object distances $\hat{P}_{o2}$ and the second focusing element distances $P_{f2}$. In order to give rise to a synthetic integral image with requested proportions corresponding to the image data bearer structures perceptible from a viewing side of the polymer foil stack when the polymer foil stack is given a certain curvature, the relations between the unit vectors and/or distances in the two arrays are of importance.

Moreover, the ratios also give some indication about the intended curvature needed. If the ratios between the corresponding pairs of the first projected object distances $\hat{P}_{o1}$ and the first focusing element distances $P_{f1}$ are higher than the ratio between corresponding pairs of the second projected object distances $\hat{P}_{o2}$ and the second focusing element distances $P_{f2}$, then the intended curvature is a concave surface as seen from the viewing side if the polymer foil stack is bent around the first focusing element direction, or the intended curvature is a convex surface as seen from the viewing side if the polymer foil stack is bent around the second focusing element direction. Analogously, if the ratio between the corresponding pairs of the first projected object distances $\hat{P}_{o1}$ and the first focusing element distances $P_{f1}$ are lower than the ratio between corresponding pairs of the second projected object distances $\hat{P}_{o2}$ and the second focusing element distances $P_{f2}$, then the intended curvature is a convex surface as seen from the viewing side if the polymer foil stack is bent around the first focusing element direction, or the intended curvature is a concave surface as seen from the viewing side if the polymer foil stack is bent around the second focusing element direction. Among the exemplifying embodiments above, there are examples, where the ratio between the corresponding pairs of the first distances and the second distances is the same over at least a part of the polymer foil stack. In one embodiment, an approximate curvature corresponds a part of a circular cylinder surface. In another embodiment, the intended curvature corresponds to a part of a non-circular cylinder surface.

In other embodiments, the ratio between the corresponding pairs of the first distances and the second distances varies over at least a part of the polymer foil stack, and the intended curvature of the part can in a special case be a part of a circular cylinder surface. However, the curvature may also be such that it exhibits sections with different bending radii. In such a manner curved shapes as e.g. waveforms etc. may be used as well as e.g. a part of a cone, where the bending radius varies along the cone axis.

The differences in the ratios can be achieved by either or both of the concerned distances. In a particular embodiment, the second array is periodic in both directions, i.e. both the first and second focusing element distances are equal. In another particular embodiment, the first array is periodic in both directions, i.e. both the first and second object distances are equal.

By again referring to FIG. 5C, it can be noted that the original object array does not have to be perfectly aligned with the microlens array. In other words, the first object direction 91' does not have to coincide with the first focusing element direction 91 and the second object direction 92' does not have to coincide with the second focusing element direction 92. When bending the polymer foil stack around e.g. an axis directed along the first focusing element direction 91 results in an apparent change in distance perpendicular to this direction, as compared to the corresponding focusing element. A vector directed in a perpendicular direction to the first focusing element direction 91 will only experience a length change, but no direction change. However, a vector e.g. along the second object distances $P_{o2}$ will also experience a change in length, however, smaller than for the perpendicular vector, but the vector along the second object distances $P_{o2}$ will also experience a change in angle. By bending in appropriate directions angle differences between object arrays and focusing element arrays can be compensated, and well-behaved images can be provided.

The differences in image appearance depending on the curvature of the polymer foil stack can also be further utilized for purposes of security labelling or authenticity proof. Even a plane optical device according to the Moiré effect is difficult to copy. However, for an inexperienced viewer, it might be difficult to distinguish the well reproduced three-dimensionality of a Moiré foil from a quasi-three-dimensional image of other kinds. However, the properties of the synthetic image upon bending, according to the present invention are to our knowledge unique, and the process of bending is a concept that is easy to understand for any person. Thus, a security label that has to be bent in order to produce an image to verify is far more difficult to provide by other means than direct replicas, and is easily noticeable also for an inexperienced viewer. In order to know exactly what bending is necessary, a cliché tool may be provided, against which the polymer foil stack is forced to be supported.

The creation of the image data bearer structures in optical devices according to the present invention is preferably performed before the optical device is attached to its final application. Such an approach removes any risks for destroying the item to which the optical device is to be connected. Furthermore, it facilitates rational manufacturing, since the manufacturing of the optical device can be optimized without having to be combined with the manufacturing of the item to which it is going to be connected. It also makes it possible to manufacture the optical device in a flat form, which is often more convenient for mass production. In order to be able to create the image data bearer structures before it is connected to its final item, there has to be a well defined relation between the array of image data bearer structures and the array of focussing elements. Such well defined relation is achieved by realizing both of them in one and the same polymer foil stack. According to this preferred embodiment of the present invention, one interface is formed to by itself constitute the focussing elements, and another interface of the very same polymer foil stack includes the image data bearer structures. The microlenses are thus provided as geometrical structures as an integral part of the polymer foil itself. In such a manner, the optical device can be handled easily without jeopardizing the structures of the arrays or the relative positions. No need for precise positioning of any external objects, such as separate lens elements or separate image structures, to be attached to the optical device is then requested.

When the optical device is produced separately from the item to which it is going to be applied to, it also allows for creation of the image data bearer structures from "behind", i.e. not through the microlenses. The image data bearer structures can thereby be provided by a large variety of methods. Embossing or printing are the most probable techniques for providing the image data bearer structures. However, also different photographic or lithographic methods could also be used, depending on the required size and accuracy of the image data bearer structures.

Figure 6A:
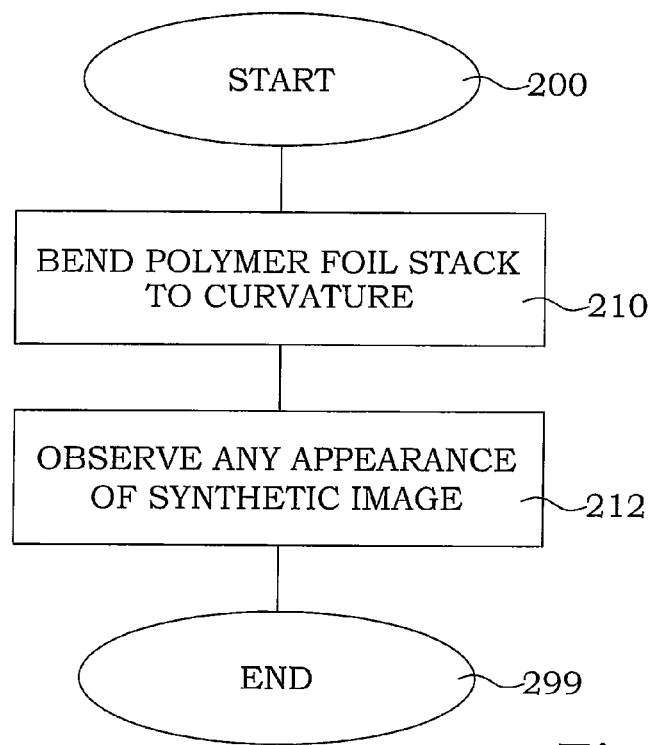
FIG. 6 is a flow diagram of steps of an embodiment of a method according to the present invention.

In FIG. 6A, a flow diagram of steps of an embodiment of a method according to the present invention is illustrated. A method for authentication of an object having a polymer foil stack provided at a surface of the object starts in step 200. The polymer foil stack is made according to the principles mentioned further above. In step 210, the polymer foil stack is bent according to a predetermined first curvature in a predetermined first direction. This bending can in one embodiment be performed by supporting the polymer foil stack against a cliché tool having a surface exhibiting the predetermined first curvature. In another embodiment, the bending can be performed by hand without any aids. By selecting a suitable rigidity of a polymer foil stack, and pressing the ends of the polymer foil stack together, the polymer foil stack bends in a shape close to a parabolic shape, which further above was found to be a quite useful shape. This can also be achieved by a thinner polymer foil stack attached to a substrate of suitable rigidity. In step 212, any appearance of a first synthetic integral image is observed as a sign of authenticity. The steps 210 and 212 can in particular embodiments then be repeated by e.g. bending the polymer foil stack to another curvature and/or in another direction for revealing any additional appearances of images. The method ends in step 299.

For use of a polymer foil stack for purpose of authentication, it could be beneficial if the image provided with a plane polymer foil stack is as unperceivable as possible in a plane condition. One way to arrange for this is to make the magnification in the second direction infinite when the foil is plane, c.f. FIG. 3E. According to equation (1) this occurs when the ratio between corresponding pairs of the first distances or the second distances is equal to unity. Thus, in order to destroy any image at a plane foil condition, the ratio between corresponding pairs of the first distances or the second distances should be at least very close to unity.

By having the ratios close or equal to unity also opens up for other useful properties. By bending the foil in a convex manner relative to a viewer around an axis, the apparent distance between the structures at the object plane becomes shorter in the direction perpendicular to the axis, and eventually the same magnification as in the axis direction may be reached also for an initially unity ratio perpendicular to the axis. A real image can then be seen. However, if the foil instead is bent in a concave manner, the apparent distance between the structures at the object plane becomes longer and a position will eventually be reached where the same magnification again is reached according to eq. (1), however, now inverted. A mirror image can be seen, however, with apparent depth being different when viewed in different directions. By having the plane situation close to a ratio of unity, both the real and mirror image may be reached within reasonable bending radii. The perceived apparent depth is determined by the apparent depth in the direction parallel to a connection line of a viewers two eyes. This means that by rotating the polymer foil stack, the apparent depth can vary depending on the orientation. This effect may also be used for authentication purposes.

A polymer foil stack where, in plane or bent condition, the apparent ratio between object and focusing element distances is different in different directions will according to eq. (6) give rise to different apparent image depths when viewed in different directions. The perceived image depth, when viewing the foil oriented in a certain direction, will be determined by the ratio in the direction that is parallel to an axis set up of the viewers left and right eye. By rotating the polymer foil stack around an axis parallel to the viewing direction, the apparent image depth will vary. By having the apparent ratio between object and focusing element distances in one direction smaller than 1 and in the other direction larger than one, the image will appear as changing from a position in front of the polymer foil stack to a position behind the polymer foil stack upon rotation. In a particular embodiment, the ratios can be selected to be at equal difference to unity, but in opposite direction, thereby providing the same magnification but an image depth with differing sign.

Figure 6B:
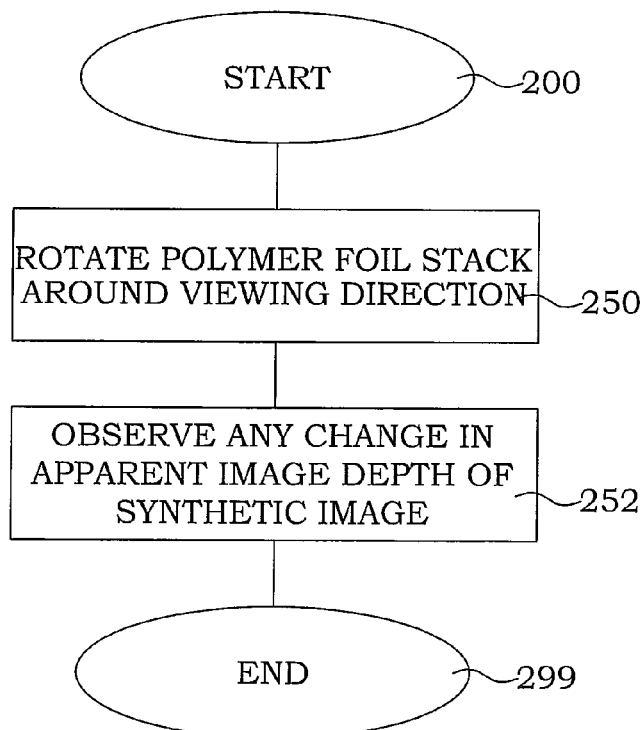

In FIG. 6B, a flow diagram of steps of an embodiment of a method according to the present invention is illustrated. A method for authentication of an object having a polymer foil stack provided at a surface of the object starts in step 200. The polymer foil stack has different apparent ratio between object and focusing element distances in different direction. In step 250, the polymer foil stack is rotated around an axis having a component in a direction in which the polymer foil stack is viewed. In step 252, any change of an apparent image depth of a first synthetic integral image is observed as a sign of authenticity. The method ends in step 299.

The use of different images at different bending conditions can also be utilized more expressed, by providing two sets of images by the same foil stack. This is achieved by letting the first interface of the optical device further comprise optically distinguishable image data bearer structures in a third array, superimposed on the optically distinguishable image data bearer structures of said the array. One embodiment of such an arrangement is schematically illustrated in FIG. 7A. A second array 13 of focusing elements is provided, in this embodiment microlenses 14. For simplicity, this second array 13 is in this embodiment periodic in two perpendicular directions, which the same period. In the present embodiment, a first array 15 of optically distinguishable image data bearer structures 16, in this case "A's", is provided below the array 13 of focusing elements. The first array 15 is defined by a first object unit vector $v_{o1}$ in the first focusing element direction 91 and by a second object unit vector $v_{o2}$ in the second focusing element direction 92. The period $P_{o2}$ in the second focusing element direction 92 is larger than the period $P_{o1}$ in the first focusing element direction 91. Superimposed on this first array 15, a third array 85 of optically distinguishable image data bearer structures 86, in this case "B's", is provided. The third array 85 is in the present embodiment a periodic array defined by a third object unit vector $v_{o3}$ and a fourth object unit vector $v_{o4}$. The image data bearer structures 86 in the third array 85 are repeated with fourth object distances $P_{o4}$ in essentially the second focusing element direction 92. The third object distance $P_{o3}$ in the first focusing element direction 91 is as mentioned constant, but different from the first array 15, which implies a different magnification and different apparent depth. The object distances $P_{o4}$ of the third array 85 in the second focusing element direction 92 is larger than the period $P_{o3}$ in the first focusing element direction 91, however, with a different ratio than for the first array 15. This means that another bending condition is required to achieve a perceptible image from this third array 85. In other words, in a plane condition, only "bad" images are present. At a first bending condition, an image "A" is seen and at a second bending condition, an image "B" is seen. By modifying the distances within the arrays, different radii and shapes of the curvatures for achieving the different images can be obtained. In other words, a ratio between corresponding pairs of the third distances and the second distances is different from a ratio between the length of the third unit vector and the length of the second unit vector as well as different from the ratio between corresponding pairs of the first distances and the second distances. By this, a synthetic integral image corresponding to the image data bearer structures in the third array is perceptible from the viewing side of the polymer foil stack when the polymer foil stack is given a certain curvature around axes parallel to the first direction different from which causes the synthetic integral image corresponding to the image data bearer structures in the first array to be perceptible.

Figure 7C:
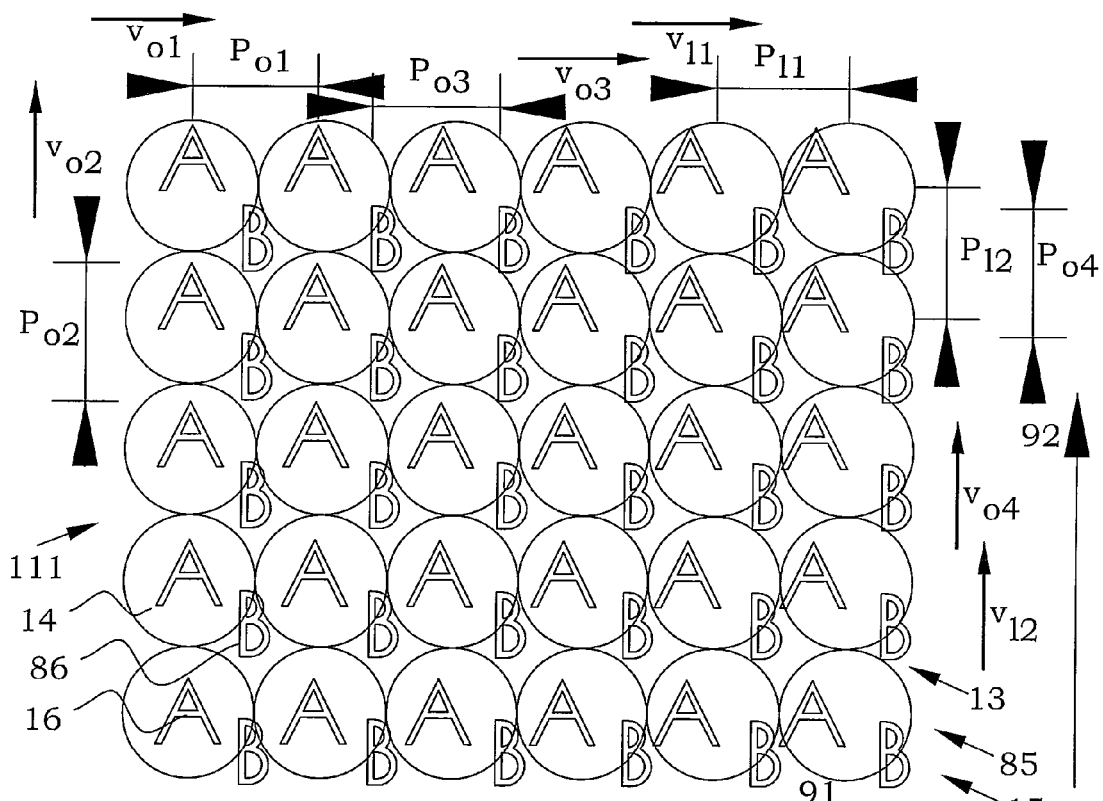
FIG. 7A-7C are schematic top view illustrations of embodiments of optical device according to the present invention giving more than one image.
Figure 7A:
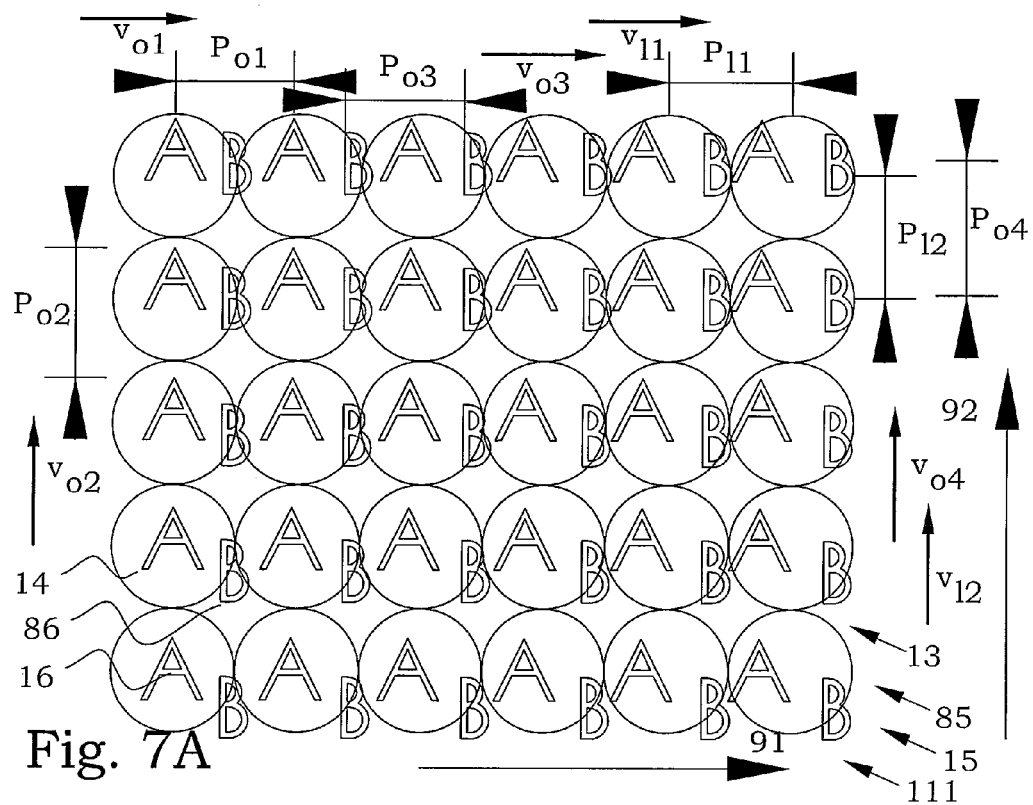
Figure 7B:
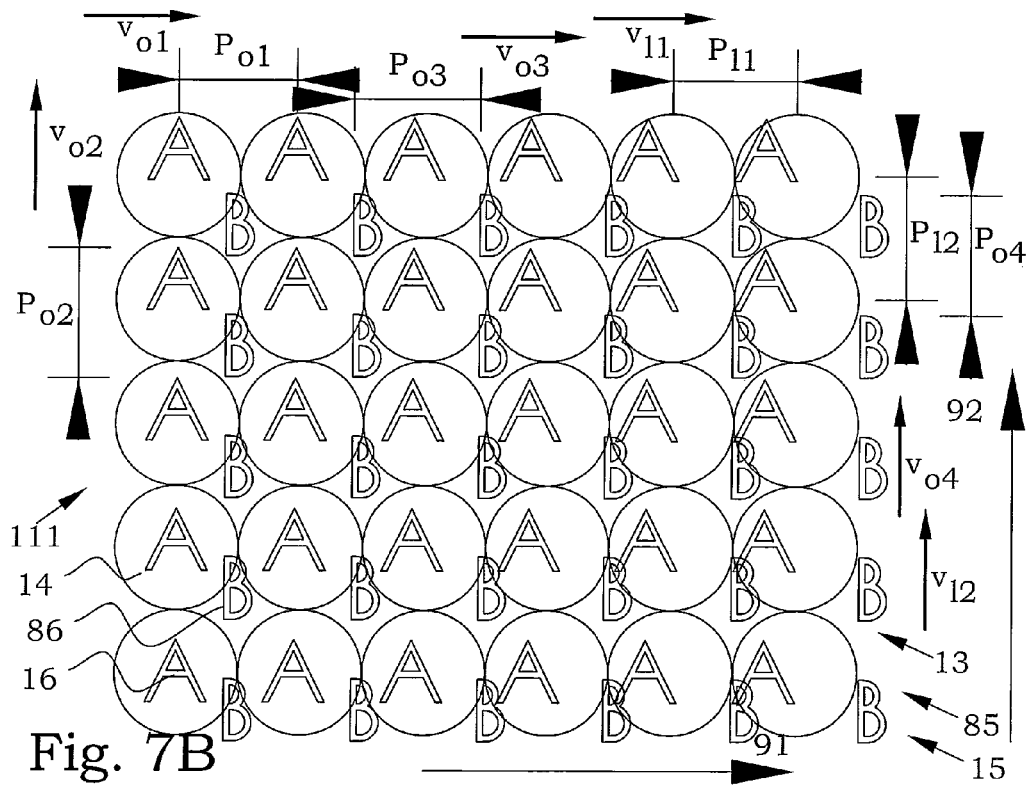

In FIG. 7B, another embodiment with superimposed images is illustrated. In this embodiment, the first array 15 gives an image when the foil is bent around an axis directed in the first focusing element direction 91, and the third array 85 gives an image when the foil is bent around an axis directed in the second focusing element direction 92. The second array 13 is also here periodic also in the second focusing element direction 92, whereby the second distances $P_{f2}$ are all equal. The third array 85 is an array that is periodic in at least essentially the second focusing element direction 92. The periodicity is defined by the fourth object unity vector $v_{o4}$. The image data bearer structures 86 in the third array 85 are instead repeated with third distances $P_{o3}$ in essentially the first focusing element direction 91. Furthermore, a ratio between corresponding ones of the third distances $P_{o3}$ and a length of the first object unit vector $v_{f1}$ is different from a ratio between the length of the fourth object unit vector $v_{o4}$ and the mentioned third object distances $P_{o3}$. By this, a synthetic integral image corresponding to the image data bearer structures 86 in the third array 85 is perceptible from the viewing side of the polymer foil stack when the polymer foil stack is given a certain curvature around axes parallel to the second focusing element direction 92.

In a more general description, the image data bearer structures in the additional array are repeated with third object distances in a third object direction and with fourth object distances in a fourth object direction. Third projected object distances are defined as the third object distances as projected onto the first focusing element direction and fourth projected object distances are defined as the fourth object distances as projected onto the second focusing element direction. Third ratios between corresponding pairs of the third projected object distances and the first focusing element distances are different from fourth ratios between corresponding pairs of the fourth projected object distances and the second focusing element distances. A synthetic integral image corresponding to the image data bearer structures in the third array is perceptible with requested proportions from the viewing side of the polymer foil stack when the polymer foil stack is given a certain curvature different from which causes the synthetic integral image corresponding to the image data bearer structures in the first array to be perceptible with requested proportions.

Of course, the additional image could also be provided so as to be seen in a plane condition. This is illustrated by an embodiment of FIG. 7C. Here, a ratio between corresponding pairs of the fourth object distances $P_{o4}$ and the second focusing element distances $P_{f2}$ is equal a ratio between the corresponding pairs of the third object distances $P_{o3}$ and the second first focusing element distances $P_{f1}$. In the present embodiment, the array of image data bearer structures and the array of focusing elements are periodic arrays in both directions, which then leads to that a ratio between a length of the fourth object unit vector $v_{o4}$ and a length of the second focusing element unit vector $v_{f1}$ is equal to the ratio between the length of the third object unit vector $v_{o3}$ and the length of the first focusing element unit vector $v_{f1}$. A synthetic integral image corresponding to the image data bearer structures 86 in the third array 85 is then perceptible from the viewing side of the polymer foil stack when the polymer foil stack is plane.

In a more general description, the image data bearer structures in the additional array are repeated with third object distances in the first focusing element direction and with second object distances in the second focusing element direction. Third ratios between corresponding pairs of the third object distances and the first focusing element distances are equal to fourth ratios between corresponding pairs of the fourth object distances and the second focusing element distances. A synthetic integral image corresponding to the image data bearer structures in the third array is then perceptible with requested proportions from the viewing side of the polymer foil stack when the polymer foil stack is plane.

The concept of having two different images appearing at different bending conditions can be further improved by letting one image be intentionally bad at the same conditions as when the other image is perceptible and vice versa. In other words, at optimum imaging conditions for the first array, an image emanating from the third array presents an infinite magnification in one direction and/or at optimum imaging conditions for the third array, an image emanating from the first array presents an infinite magnification in one direction.

The method for authentication can then be made even more elaborate in that the bending of the polymer foil also comprises bending the polymer foil stack according to a predetermined second curvature. This second curvature could be a different curvature than the first one, but in the same direction, or it could be a second curvature in the second direction. A second synthetic integral image may then appear and be the sign for an authentic product.

The use of optical devices according to the present invention as authentication means is facilitated if the thickness of the polymer foil stack or the sheet on which such polymer foil stack is attached is selected not to be too thick or too thin. A thin foil is difficult to handle and to bend in a controlled manner and is experienced as flabby and is preferably supported by some bearer material. A too thick foil is instead difficult to bend. As a non-exclusive example, an optical device based on 250 µm thick polycarbonate has successfully been tested. However, other materials and thicknesses are also possible to use.

Figure 8A:
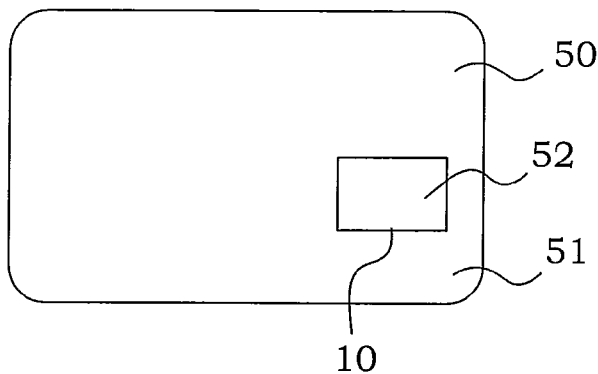
FIG. 8A is a schematic illustration of an embodiment of a valuable object according to the present invention.

An optical device according to the present invention thus has many applications. By providing the geometrical structures inside the polymer foil, e.g. by covering the backside of an imprinted foil with an additional irremovable layer, as to form a monolithic foil, the possibilities to copy the optical device are practically entirely removed. This makes the optical device very interesting as a security label, as also discussed further above. In FIG. 8A, a valuable object 50, in this case a credit card 51, comprises a security label 52 comprising at least one optical device 10 according to the above description. In a typical case, the optical device 10 is adhered in some way to the valuable object 50, e.g. as a security thread in a bank note. A characteristic image can easily be provided by bending the optical device 10 in order to certify that the valuable object 50 is a genuine one. The valuable object may not necessarily be an object directly connected to economical transactions. The valuable object may also e.g. be clothes, watches, electronics products etc. where counterfeiting is common.

Figure 8B:
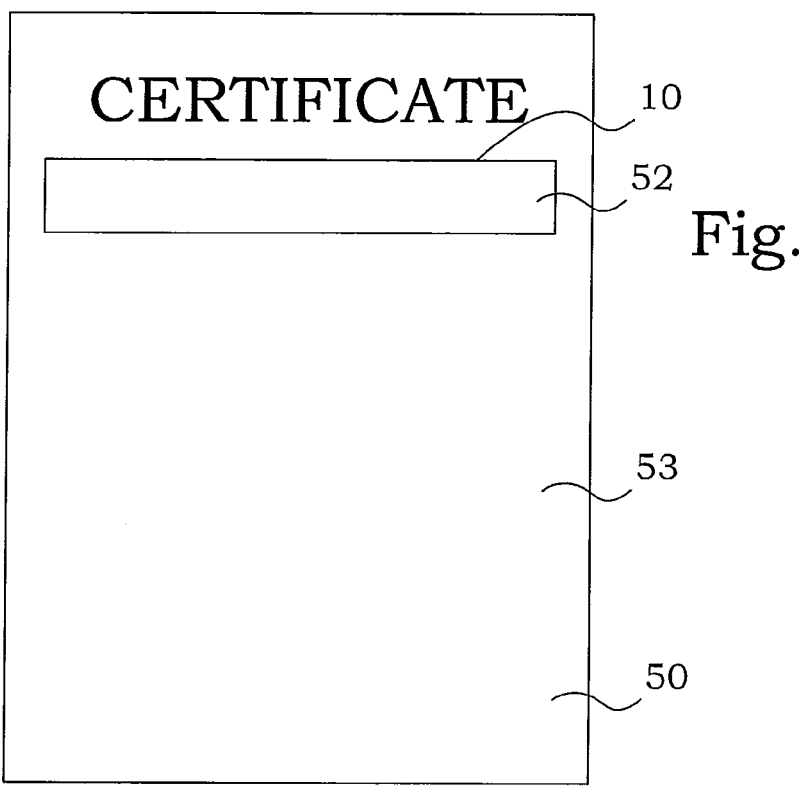
FIG. 8B is a schematic illustration of an embodiment of a valuable document according to the present invention.

Since the optical devices according to the present invention are believed to be of reasonable cost, a security label 52 comprising at least one optical device 10 according to the above description can even be of interest to certify the genuinety of documents 53, as illustrated in FIG. 8B. The document 53 may be valuable as such, e.g. a bank note or a guarantee commitment. However, the document 53 may not necessarily have any own value, but the security label 52 can be provided in order to guarantee that the information in the document is authentic.

Figure 8C:
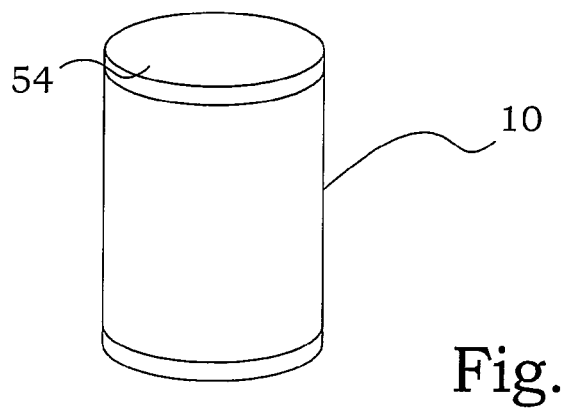
FIG. 8C is a schematic illustration of an embodiment of a package according to the present invention.

Since the mass production costs of the optical device are expected to be small, the size of the security label does not necessarily have to be small. It is even feasible that the security may occupy a large part of a surface of an object in order to verify the authenticity. FIG. 8C illustrates a package 54 to a large extent consisting of a large area optical device 10 according to the present invention. Due to the specific properties of the optical devices according to the present invention, the package preferably has a curved surface or is possible to bend. If a non-transparent appearance is preferred, the optical device 10 is preferably adhered to some backing material, typically based on some paper product. Since the optical appearance of the optical device 10 may be designed to be attractive for a view to look at, the optical device 10 can have the combined functionality of ensuring authenticity as well as providing an eye-catching package material. It would e.g. be possible to authenticate e.g. a perfume by providing a package or even the perfume bottle itself by the optical device 10, which is very suitable with bended polymer foils. The present invention is thus very suitable to be applied to different types of bottles and cans.

The applications of optical devices according to the present invention are enormous. Most applications are based on sheet materials, where the optical device can be provided as a part or the entire sheet material. The fields of application are very different, ranging from e.g. currencies, documents, financial instruments, product and brand protection, product marking and labelling, packaging, tickets, book covers, electronic equipment, clothes, footwear, bags, wallpapers to toys. The optical devices can be applied in any context where the appearance of a virtual three-dimensional image may be of benefit.

Figure 9A:
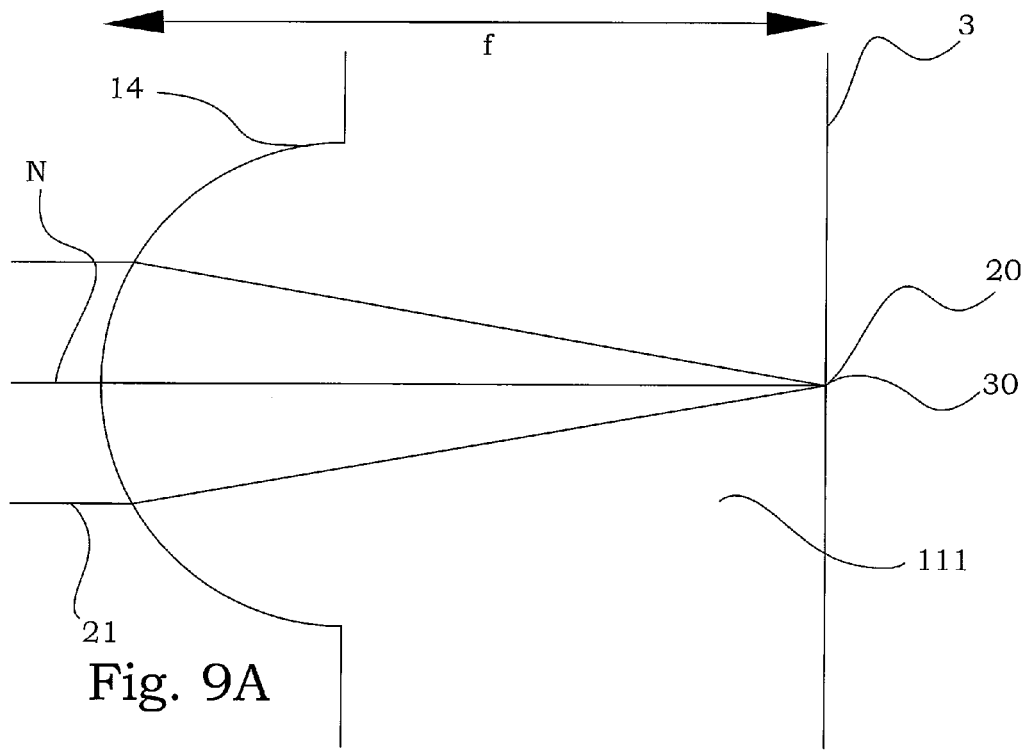
FIGS. 9A-9B are schematic illustrations of focal planes of a polymer foil stack at different angles.
Figure 9B:
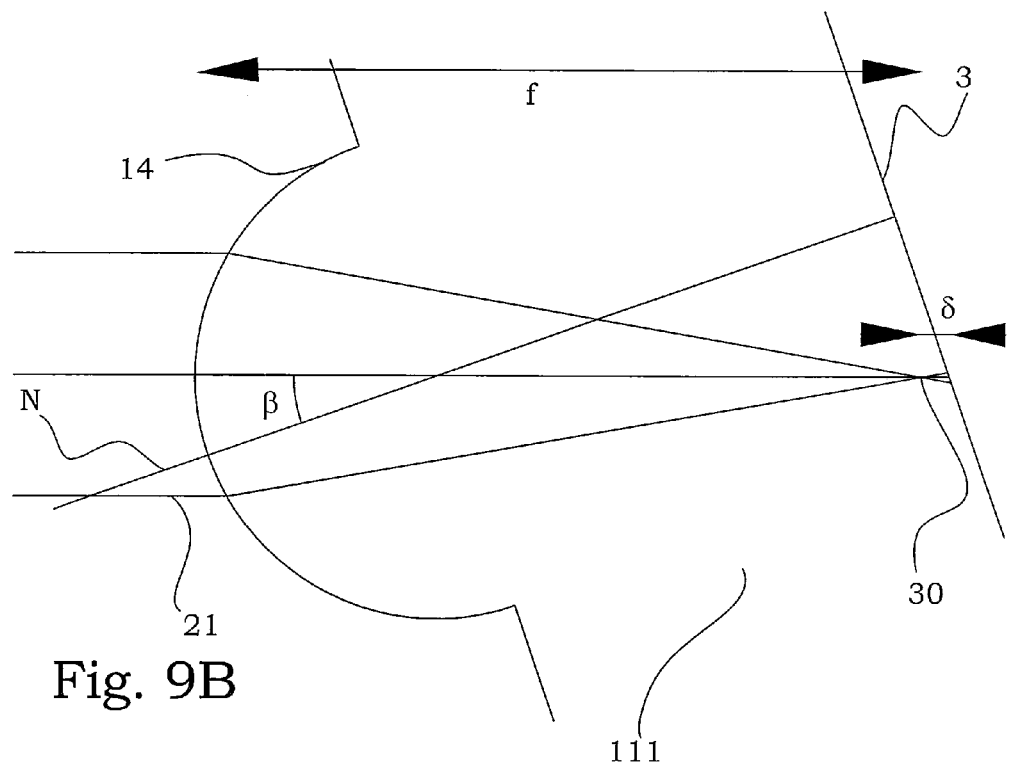

When using optical devices according to the above ideas, it is intended to view at least parts of the optical device from a non-perpendicular direction. In other words, many of the data bearer structures that are viewed are viewed in an angle, not perpendicular to the general surface of the optical device. FIG. 9A illustrates a situation when a perpendicular view is used. A normal N of the polymer foil stack 111 coincides with the direction of view 21 illustrated as a bunch of light rays. The focal length of the microlens 14 is approximately equal to the thickness of the foil and a focus point 30 coincides with a spot at the object plane 3. FIG. 9B illustrates instead a situation when a non-perpendicular view is used. This situation is common when the polymer foil stack 111 is bent. The normal N of the polymer foil stack 111 no longer coincides with the direction of view 21. The result is that the focal point 30 occurs a distance δ in front of the object plane 3. This also means that the area at the object plane 3 that is covered by the rays is imagined in a mirror fashion. It is therefore an advantage to use such arrays of image structures that on purpose gives an inverted image, in order to make the images clearer.

Figure 9C:
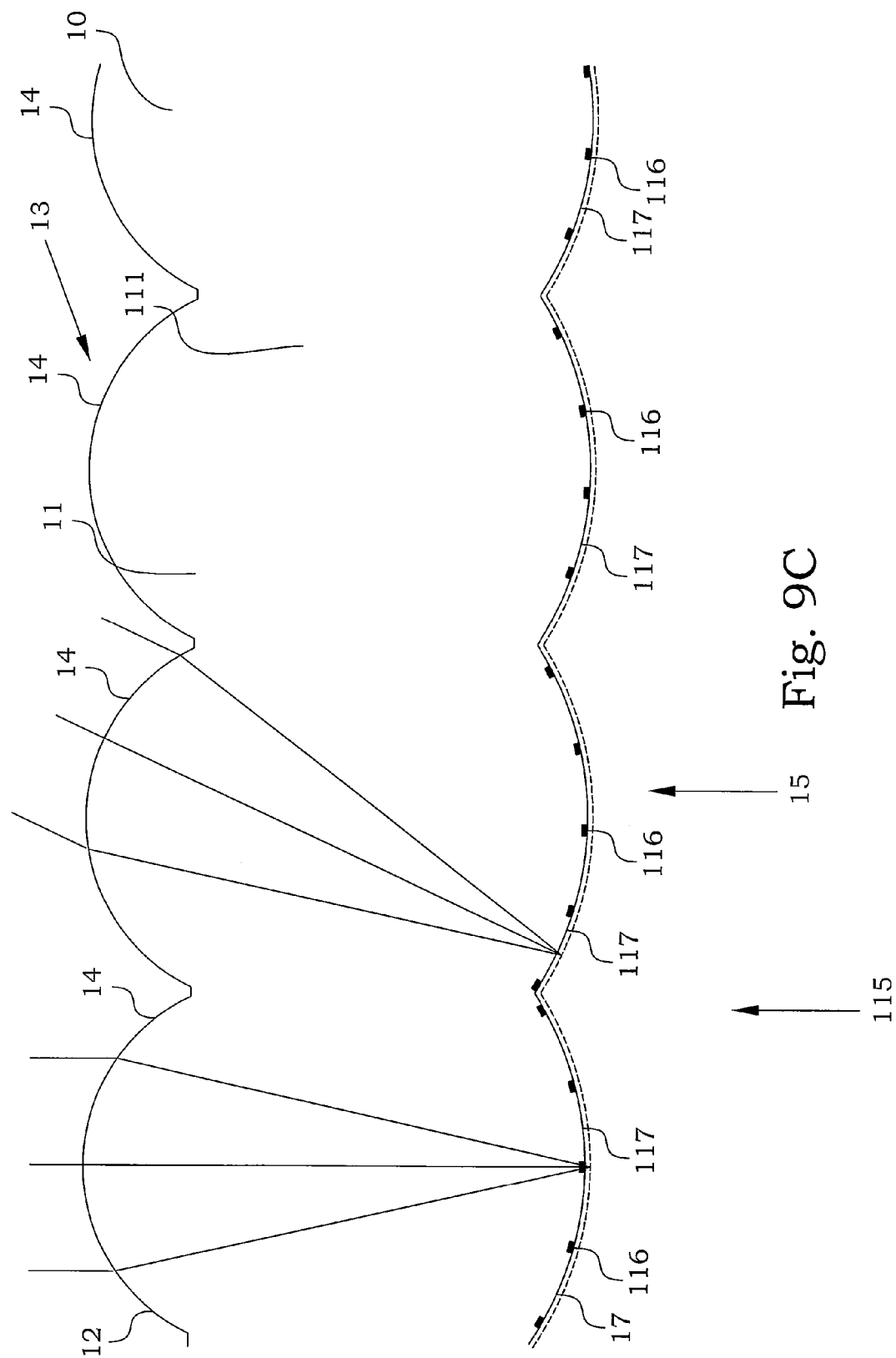
FIG. 9C is a schematic illustration of an embodiment of an optical device having data bearer structures provided at a curved interface.

Another possibility is illustrated in FIG. 9C. Instead of having the image data bearer structures provided in a flat relationship, the image data bearer structures 116 are instead superimposed onto an interface having a general shape defined by an array 115 of curved interface portions 117. The array 115 of curved interface portions 117 is in registry with the array 13 of microlenses 14. Furthermore, the distance between the interface 12 of the microlenses 14 and the interface 17 of the curved interface portions 117 is close to a focal length of the microlenses 14. Since both interfaces are curved, such distance is in the present disclosure defined as the maximum distance, in the direction of the main surface normal N, between any portions of the interfaces. Preferably, each of the curved interface portions 117 correspond to a total image optimum appearance plane 31 of a respective microlens 14. The total image optimum appearance plane 31 is a plane at which image data bearer structures 116 are depicted through the microlenses 14 in an optimum manner, defined according to a predetermined criterion. In such an arrangement, the imaging is always performed with a correct focal length. However, the maximum angle over which a sensible image is possible to perceive may instead be limited.

An alternative to the curved interface embodiment of FIG. 9C would be to modify the focal length of the microlenses that are intended to be viewed in larger angles. By defining a middle position of the polymer foil stack, the microlenses at each sides can be provided with successively longer focal lengths, to correspond to the longer light path through the foil stack.

Now, returning to FIG. 3E, it can be noted that the illustrated situation corresponds to what a viewer will perceive if the synthetic integral image device is viewed from a distance from the surface of the synthetic integral image device. The illustrated rays leave the synthetic integral image device as a bunch of parallel rays. This is the actual situation when the viewing distance is infinite. However, it is also a good approximation for most cases where the synthetic integral image device is viewed from a normal distance. A normal viewing distance is typically larger than 15 cm and normally around 30-40 cm. At such distances, the angle divergence of rays passing different focusing elements is neglectable and parallel rays can be used as a good approximation. As mentioned further above, the synthetic integral image in the direction depicted in FIG. 3E has an infinite magnification and imaginary image depth, which in practice leads to a nonsense image. The result is thus also a synthetic image of no immediate use. However, if the viewer moves the synthetic integral image device very close to the eye, the deviation in angles starts to become significant and the situation changes.

In FIG. 10A, the device of FIG. 3E is again illustrated. However, in this figure, rays corresponding to a close viewing distance are illustrated. The rays from the middle focusing element are illustrated to leave the main surface of the synthetic integral image device in a perpendicular fashion. The rays from the left and right focusing elements are illustrated to leave the main surface of the synthetic integral image device with a small angle γ with respect to the perpendicular direction. The different ray will thereby meet at a distance A, where the viewer's eye is present. The rays from the left and right focusing elements emanate from different parts of the geometrical structures 16A-C compared to the rays leaving the middle focusing element. An integral image can thereby be constructed by the viewer. A typical distance at which an image can be perceived is in the order of a few centimeters, e.g. 1-3 cm, and preferably at least less than twice the distance between the viewer's eyes. In one embodiment, the synthetic integral image device is held against the face, thereby giving a viewing distance of approximately 1 cm.

Figure 10B:
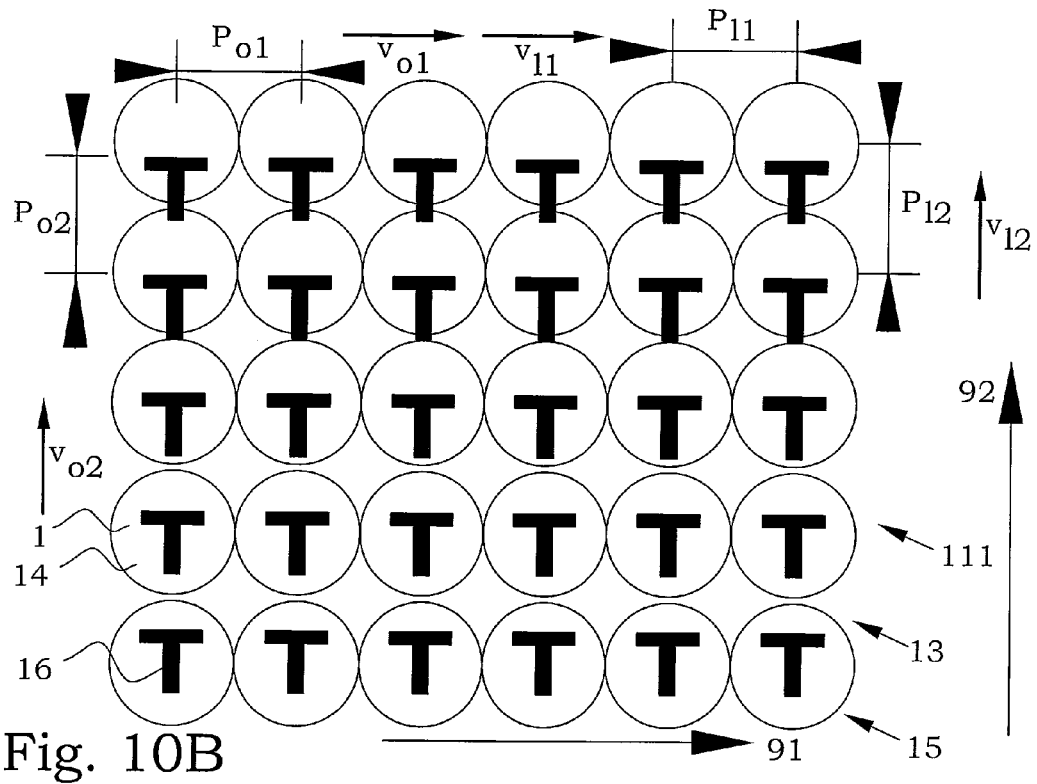
FIGS. 10B-10C are schematic top view illustrations of other embodiments of optical device according to the present invention.

The property of such an image appearance at small viewing distances is to our knowledge unique for this kind of arrangements and cannot easily be resembled by other techniques. It is also very difficult to copy this kind of arrangements, which means that the property can be connected to an authentic arrangement, which thereby can be used as a security label. An appropriate arrangement should when viewed at a "normal" distance preferably give rise to a nonsense image. This is easiest achieved by letting the unit vectors of the focusing element array and object array be equal, at least in one direction, such as indicated in FIG. 3E. One example of an embodiment of an optical device according to the present aspect of the present invention as viewed in a direction parallel to a normal to a normal of the foil or foil stack is illustrated in FIG. 10B. An array 15 of geometrical structures 16, in this embodiment illustrated with a "T" is placed under and viewed through an array 13 of focusing elements 1, in this embodiment, microlenses 14, illustrated by circles, in analogy with FIG. 4A. In this embodiment, the closest focus element distance $P_{f1}$ is equal to the closest object distance $P_{o1}$. Since this embodiment comprises periodic arrays, the focus element unit vector $v_{f1}$ is equal to the object unit vector $v_{o1}$. In this embodiment, the unit vectors in the other direction do not agree.

Figure 10C:
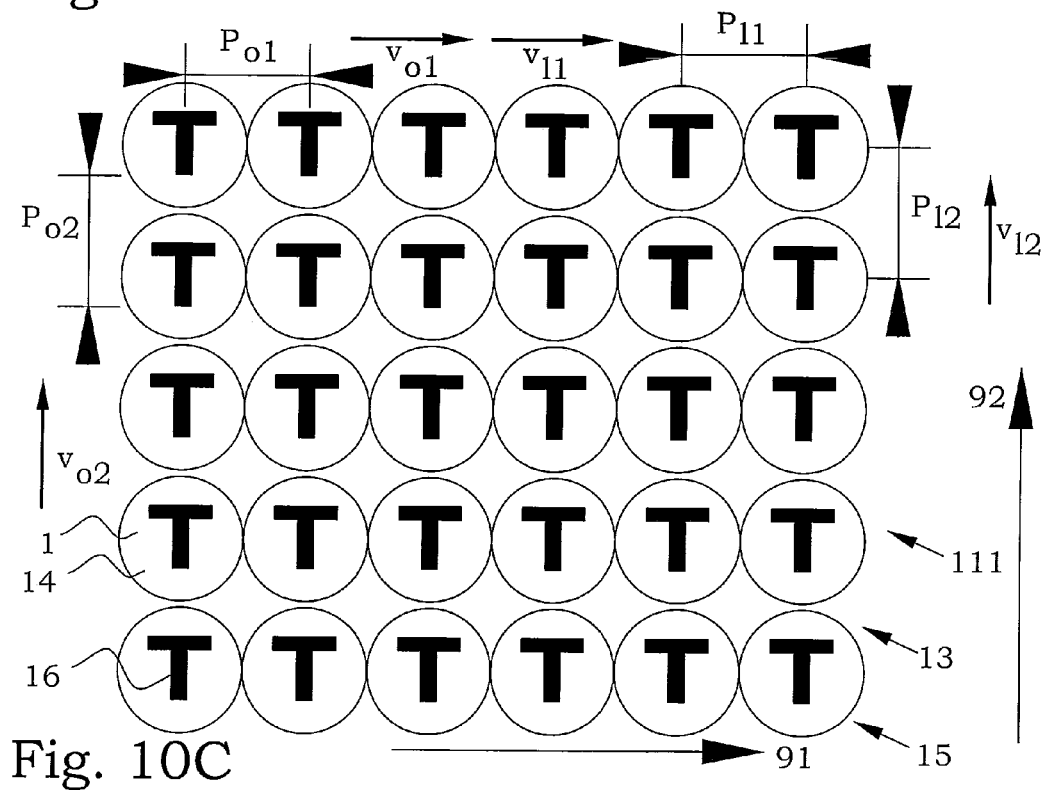

In another embodiment, illustrated in FIG. 10C, also the closest focus element distance $P_{f2}$ is equal to the closest object distance $P_{o2}$, and since it is a periodic arrangement, the focus element unit vector $v_{f2}$ is equal to the object unit vector $v_{o2}$. In other words, in a most general case, at least one of first ratios between corresponding pairs of first projected object distances $\hat{P}_{o1}$ (in analogy with earlier definitions) and first focusing element distances $P_{f1}$ and second ratios between corresponding pairs of second projected object distances $\hat{P}_{o2}$ (in analogy with earlier definitions) and second focusing element distances $P_{f2}$ are very close or equal to unity. Thereby, the synthetic integral image corresponding to the image data bearer structures is perceptible from a viewing side of the polymer foil stack only when viewed from a very small distance.

This approach can also with advantage be combined with a superimposed image visible from large viewing distances in analogy with the ideas presented in connection with FIGS. 7A-C.

As seen from the description of FIG. 10A, viewing the synthetic integral image device from a very close distance influences the fictive period distance of the synthetic integral image device. This is a result of the fact that rays, emanating from the surface of the synthetic integral image device and impinging on an eye placed very close to the synthetic integral image device, differ significantly in angle. The fictive period of the objects is thereby not compared to the actual lens period, but to a period of the microlenses as projected in the direction of the different angles. An object array having a real object period equal to the real microlens period thus obtains a different fictive period, and an image can be created. This effect of changing a fictive object period takes place in two dimensions, which is why synthetic integral image devices according to FIG. 10C are the most preferable, since the same period always is experienced in both horizontal and vertical directions. In the case of FIG. 10B, the period in the vertical direction (according to the Figure) is always smaller than in the horizontal direction. However, at small distances, this difference in periodicity becomes small enough to anyway give rise to a perceivable image, even if it doesn't become perfectly sharp or having exactly the intended proportions. In other words, the infinite magnification of an object pattern having the same periodicity as the microlens patterns changes much more by a change in the viewing distance compared to an object pattern having a finite magnification.

Furthermore, it is preferable to use images having a large apparent depth for this kind of applications. The reason is that the eye has a certain closest focusing distance, and if the distance between the eye and the synthetic integral image device is smaller than this minimum focusing distance, the image depth contributes to the ability to perceive a focused image.

The property of the optical device to provide an appearance and disappearance of an image when changing the viewing distance can also be utilized in a method for authentication of an object. In FIG. 11, a flow diagram of steps of an embodiment of a method according to the present invention is illustrated. The method for authentication of an object starts in step 200. The object has a polymer foil stack provided at a surface of the object. The polymer foil stack comprises at least one polymer foil. A first interface of the polymer foil stack comprises optically distinguishable image data bearer structures in a first array. A second interface of the polymer foil stack has focusing elements in a second array. The second interface is provided at a distance from said first interface. In step 270, the polymer foil stack is moved in either direction between a first distance relative a viewer and a second distance relative a viewer. The second distance is considerably smaller than the first distance. In step 272 any appearance of a first synthetic integral image is observed during the moving as sign of authenticity. The first synthetic integral image corresponds to the image data bearer structures. The procedure ends in step 299.

The aspect of viewing the synthetic integral image device from a small distance results in a change in the fictive object period in two dimensions. The aspect of bending the synthetic integral image device results in a change in the fictive object period in one dimension. Thus, in both these aspects, a change in the viewing conditions between the viewer's eye and the synthetic integral image device results in a change of the fictive object period in one or two dimensions. By arranging an object array on purpose in such a way that only such a change in viewing conditions will give rise to the intended image opens possibilities for use as e.g. security devices, as described above.

It is of course also possible to use the change in viewing conditions from both aspects at the same time. In other words, the object arrays can be adapted to give rise to the intended image only when the synthetic integral image device is bent and viewed from a short distance. The number of possible such variations and combinations is practically endless and only limited by the imagination of the designer.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Optical device for providing a synthetic integral image, comprising a polymer foil stack;
    said polymer foil stack comprising at least one polymer foil;
    a first interface of said polymer foil stack comprising optically distinguishable image data bearer structures in a first array;
    a second interface of said polymer foil stack having focusing elements in a second array;
    said second interface being provided at a distance from said first interface;
    said image data bearer structures in said first array being repeated with first object distances in a first object direction and with second object distances in a second object direction, provided at a first angle with respect to said first object direction;
    said focusing elements in said second array being repeated with first focusing element distances in a first focusing element direction and with second focusing element distances in a second focusing element direction, provided at a second angle with respect to said first focusing element direction;
    wherein said first focusing element direction is parallel to said first object direction;
    wherein said second focusing element direction is parallel to said second object direction;
    wherein both first ratios between corresponding pairs of said first object distances and said first focusing element distances and second ratios between corresponding pairs of said second object distances and said second focusing element distances are equal to unity;
    whereby said synthetic integral image corresponding to said image data bearer structures is perceptible as a synthetic integral image from a viewing side of said polymer foil stack only when viewed from a distance being less than 14 cm.

2. Optical device according to claim 1, wherein said first array is periodic in said first object direction, whereby said first object distances are equal to a length of a first object unit vector, and wherein said second array (13) is periodic in said first focusing element direction, whereby said first focusing element distances are equal to a length of a first focusing element unit vector.

3. Optical device according to claim 1, wherein said first array is periodic in said second object direction, whereby said second object distances are equal to a length of a second object unit vector and wherein said second array is periodic in said second focusing element direction, whereby said second focusing element distances are equal to a length of a second focusing element unit vector.

4. Optical device according to claim 1, wherein said first interface further comprises optically distinguishable image data bearer structures in a third array, superimposed on said distinguishable image data bearer structures of said first array.

5. Optical device according to claim 4, wherein said image data bearer structures in said third array being repeated with third object distances in said first focusing element direction and with fourth object distances in said second focusing element direction; third ratios between corresponding pairs of said third object distances and said first focusing element distances are equal to fourth ratios between corresponding pairs of said fourth object distances and said second focusing element distances, said third and fourth ratios being different from unity; whereby a synthetic integral image corresponding to said image data bearer structures in said third array is perceptible with requested proportions from said viewing side of said polymer foil stack when viewed from a distance larger than 15 cm.

6. Optical device according to claim 1, wherein said synthetic integral image corresponding to said image data bearer structures is perceptible as said synthetic integral image from said viewing side of said polymer foil stack only when viewed from a distance being less than 3 cm.

7. Method for authentication of an object having a polymer foil stack provided at a surface of said object, said polymer foil stack comprising at least one polymer foil, a first interface of said polymer foil stack comprising optically distinguishable image data bearer structures in a first array, a second interface of said polymer foil stack having focusing elements in a second array, said second interface being provided at a distance from said first interface, said image data bearer structures in said first array being repeated with first object distances in a first object direction and with second object distances in a second object direction, provided at a first angle with respect to said first object direction, said focusing elements in said second array being repeated with first focusing element distances in a first focusing element direction and with second focusing element distances in a second focusing element direction, provided at a second angle with respect to said first focusing element direction, wherein said first focusing element direction is parallel to said first object direction, wherein said second focusing element direction is parallel to said second object direction, wherein both first ratios between corresponding pairs of said first object distances and said first focusing element distances and second ratios between corresponding pairs of said second object distances and said second focusing element distances are equal to unity;

said method comprising the steps of:
moving said polymer foil stack between a first distance relative to a viewer and a second distance relative a viewer, said second distance being considerably smaller than said first distance;
wherein rays from said polymer foil stack forming a first synthetic integral image corresponding to said image data bearer structure do not converge at said first distance; and
observing said polymer foil stack at said second distance;
determining authenticity of said object when said first synthetic integral image corresponding to said image data bearer structures appears at said second distance.

8. Method for authentication according to claim 7, wherein the second distance is smaller than 14 cm.

9. Method for authentication according to claim 7, wherein said first distance is larger than 15 cm.

10. Method for authentication according to claim 7, wherein the second distance is smaller than 3 cm.

\* \* \* \* \*